(12) United States Patent
Picot et al.

(10) Patent No.: US 10,589,725 B2
(45) Date of Patent: Mar. 17, 2020

(54) WINDOW-WIPER SPRAY NOZZLE FOR A VEHICLE

(71) Applicant: Valeo Systèmes d'Essuyage, Le Mesnil Saint Denis (FR)

(72) Inventors: Philippe Picot, Le Mesnil Saint Denis (FR); Sébastien Rollet, Le Mesnil Saint Denis (FR); Patrice Guilhot, Le Mesnil Saint Denis (FR); David Poubeau, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 215 days.

(21) Appl. No.: 15/515,402

(22) PCT Filed: Oct. 1, 2015

(86) PCT No.: PCT/EP2015/072721
§ 371 (c)(1),
(2) Date: Mar. 29, 2017

(87) PCT Pub. No.: WO2016/050925
PCT Pub. Date: Apr. 7, 2016

(65) Prior Publication Data
US 2017/0232938 A1   Aug. 17, 2017

(30) Foreign Application Priority Data

Oct. 2, 2014 (FR) ..................... 14 59397
Oct. 2, 2014 (FR) ..................... 14 59398

(51) Int. Cl.
*B60S 1/52* (2006.01)
*B60S 1/34* (2006.01)
*B60S 1/40* (2006.01)

(52) U.S. Cl.
CPC ............ *B60S 1/522* (2013.01); *B60S 1/3429* (2013.01); *B60S 1/3436* (2013.01); *B60S 2001/4054* (2013.01)

(58) Field of Classification Search
CPC .. B60S 1/52; B60S 1/522; B60S 1/524; B60S 1/40; B60S 1/3862; B60S 1/3429; B60S 1/4038; B60S 1/4045; B60S 1/4054
(Continued)

(56) References Cited

U.S. PATENT DOCUMENTS

| 3,874,020 A | * | 4/1975 | Van Eekelen | ............ B60S 1/38 |
|---|---|---|---|---|
| | | | | 15/250.44 |
| 7,793,381 B2 | * | 9/2010 | Yon | ........................ B60S 1/524 |
| | | | | 15/250.04 |
| 2013/0333140 A1 | | 12/2013 | Bex et al. | |

FOREIGN PATENT DOCUMENTS

| EP | 1 985 513 A1 | 10/2008 |
|---|---|---|
| FR | 2 751 245 A1 | 1/1998 |

(Continued)

OTHER PUBLICATIONS

Machine translation of description portion of French publication 2795695, published Jan. 2001. (Year: 2001).*

(Continued)

*Primary Examiner* — Gary K. Graham
(74) *Attorney, Agent, or Firm* — Osha Liang LLP

(57) ABSTRACT

The invention relates to a window-wiper spray nozzle (350) for a vehicle, especially a motor vehicle, comprising first detachable mounting means designed to cooperate with second mounting means of a support (390) for mounting said spray nozzle, the spray nozzle comprising at least one actuating means (370), such as a push-button, independent from said mounting means and designed to release the spray (Continued)

Figure 1:
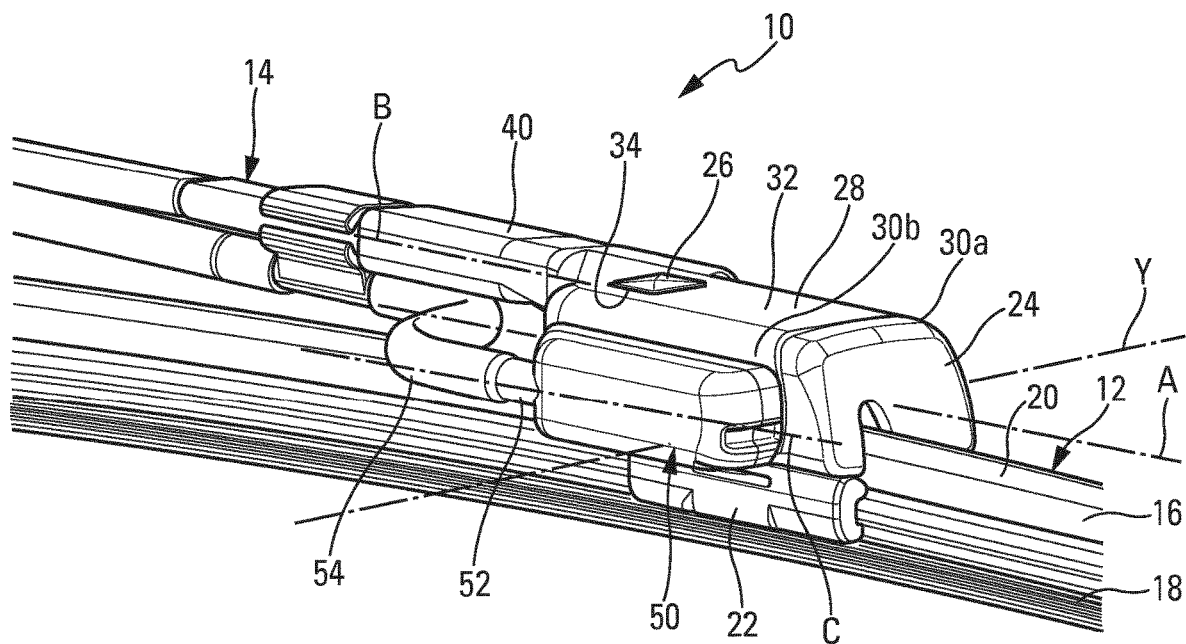

nozzle from the mounting support and thereby allow the spray nozzle to be dismounted from the mounting support.

19 Claims, 12 Drawing Sheets

(58) Field of Classification Search
USPC ............... 15/250.04; 239/284.1, 602, 600; 403/331, 336, 381
See application file for complete search history.

(56) References Cited

FOREIGN PATENT DOCUMENTS

| | | | |
|---|---|---|---|
| FR | 2756528 | * | 6/1998 |
| FR | 2 795 695 A1 | | 1/2001 |
| FR | 2902063 A1 | | 12/2007 |

OTHER PUBLICATIONS

International Search Report issued in corresponding application No. PCT/EP2015/072721 dated Jan. 22, 2016 (6 pages).

Written Opinion of the International Searching Authority issued in corresponding application No. PCT/EP2015/072721 dated Jan. 22, 2016 (7 pages).

* cited by examiner

WINDOW-WIPER SPRAY NOZZLE FOR A VEHICLE

The present invention concerns a window-wiper spray nozzle which is particularly designed to be supported by a head, such as a clevis, of a drive arm of a window-wiper blade.

A motor vehicle is conventionally provided with window-wipers in order to ensure the windshield is washed and to avoid the view the driver has of his surrounding area being disrupted. Said window-wipers generally include a drive arm, carrying out an angled movement back and forth, and elongated wiper blades, themselves bearing scraper blades which are realized in an elastic material. Said scraper blades rub against the windshield and remove the water by moving it outside the field of vision of the driver. The wiper blades are realized in the form of either, in a conventional version, pivoted brackets which hold the scraper blade at a plurality of unobtrusive points giving it a bowed form allowing it to fit the possible curvature of the windshield, or, in a more modern version, called "flat blade", in the form of a semi-rigid assembly which holds the scraper blade all along its length thanks to a or some bending vertebrae which allow the wiper blade to be applied onto the windshield without having to use brackets.

In both solutions, the wiper blade is connected to the drive arm by a fixing device which is made up by a connector and an adaptor. The connector is a part which is fixed directly on the scraper blade or directly on the "flat blade", whilst the adaptor is an intermediary part which allows the connecting and fixing of the connector on the drive arm. Said two parts are connected together by a transverse pivot axis which allows their relative rotation, in a plane perpendicular to the windshield passing through the arm. The adaptor is configured, furthermore, so as to be engaged in a head or end part in the form of a clevis of the drive arm.

The window-wipers can include means for projecting the washer fluid onto the windshield. Said projecting means can be located on the hood, on the windshield blade grill or, in a more modern version, on the window-wipers. It is known, for example, to provide such projecting means on the window-wiper blades or rather on their drive arms. In said case, the washer fluid is routed to the projecting means through tubes which are fixed to the arm and connected to a pump and to a reservoir which are generally housed under the hood of the vehicle.

The present invention proposes an improvement to said technology which is simple, efficient and economical.

According to a first aspect, the invention proposes a spray nozzle a spray nozzle for a window-wiper for a vehicle, in particular a motor vehicle, including first means for removable fixing which are configured to co-operate with second fixing means of a mounting bracket of said spray nozzle, characterized in that said spray nozzle includes at least one actuating means, such as a push-button, which is independent of said fixing means and configured to disengage the spray nozzle from the mounting bracket and thus allow the spray nozzle to be disassembled from the mounting bracket.

The actuating means is thus disengaged from the fixing means, which allows the design of the spray nozzle to be simplified and the operations of said means to be optimized.

The spray nozzle according to the invention can include one or several of the aforesaid characteristics, each taken individually or in combination with one another:
the spray nozzle includes at least two assembled parts;
the spray nozzle includes a base and a cover;
said at least one actuating means is formed of one single part with a part, such as the cover, of the spray nozzle;
said at least one actuating means is pivoted about a pivot axis defined by a hinge;
said hinge is formed by a thin film;
the spray nozzle has an elongated form, said pivot axis being substantially parallel or perpendicular to an elongation axis of the spray nozzle; it could have another orientation.

The present invention also concerns an assembly comprising a spray nozzle of the type aforementioned and a mounting bracket of said spray nozzle, said spray nozzle including first fixing means which cooperate with second fixing means of said mounting bracket in order to allow the spray nozzle to be disassembled from said mounting bracket, said mounting bracket being configured so as to be positioned and fixed on a head of an arm of the window-wiper.

The invention notably allows the production of the arm to be simplified, the mounting bracket of the spray nozzle not being formed from a single part with the arm but positioned and fixed on a head of the arm, such as a clevis.

The assembly according to the invention can include one or a plurality of the aforesaid characteristics, each taken individually or in combination with one another:
said mounting bracket is configured so as to be bonded or soldered onto a head, and in particular onto a clevis, of a window-wiper arm;
said first and second fixing means include a system with rail and slider and/or a system with elastic snap-in means, said system being configured so as to allow the mounting of the spray nozzle on the mounting bracket by sliding one in relation to the other;
said first and second fixing means include a system with elastic snapping-in means including at least one elastically deformable tab which is borne by one of the elements from the spray nozzle and the mounting bracket, said tab comprising at a free end a retaining means which is configured to cooperate with a complementary means of the other of said elements;
said tab includes at its free end a coupling tooth which is intended to be engaged in an opening of the spray nozzle, the spray nozzle comprising at least one actuating means to force said coupling tooth to exit from the opening;
said tab is configured so as to be deformed solely by means of said actuating means;
the tab is borne by said mounting bracket and includes at its free end a coupling tooth which is intended to be engaged in an opening or hollow of the spray nozzle;
the elastic snap-in system is configured so as to be actuated as the spray nozzle slides along the mounting bracket;
the system with rail and slider includes at least one rib which is substantially straight and juts out from one of the elements from the spray nozzle and the mounting bracket, and is engaged in a recess of the other one of said elements, said recess being substantially straight and having a form which is substantially complementary to that of the rib;
the system with rail and slider includes two substantially straight ribs which jut out from one of the elements from the spray nozzle and the mounting bracket, and are engaged respectively in two recesses of the other one of said elements, said recesses being substantially straight and having a form which is substantially complementary to that of the ribs;

the ribs diverge from one another in cross section so as to form retaining means in said recesses;

the or each rib has a beveled end in order to facilitate its insertion into the corresponding recess.

The present invention also concerns an arm of a window-wiper of a vehicle, in particular of a motor vehicle, including a head for connection to a blade of a window-wiper, characterized in that said arm bears an assembly according to the characteristics aforementioned, the mounting bracket of which is positioned and fixed, preferably by means of bonding or soldering, on said head. The head can include a clevis which is configured to receive a connector of said blade of the window-wiper.

Naturally, all the characteristics of the different aspects of the invention can be combined together, even if said combinations do not necessarily appear in the embodiments described below.

Figure 2:
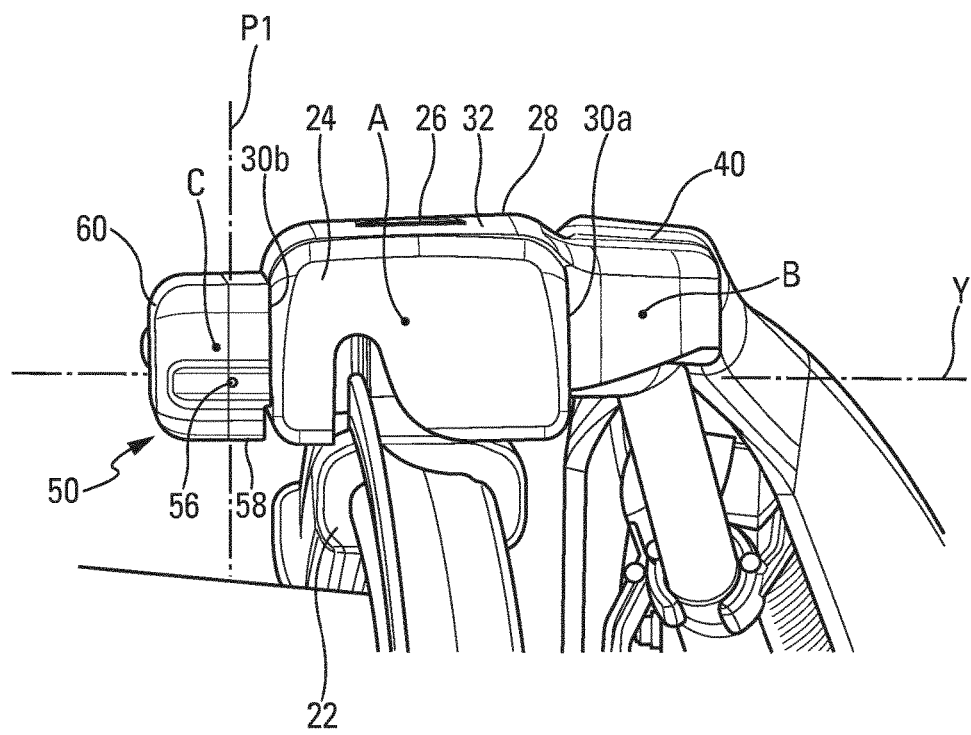
Figure 3:
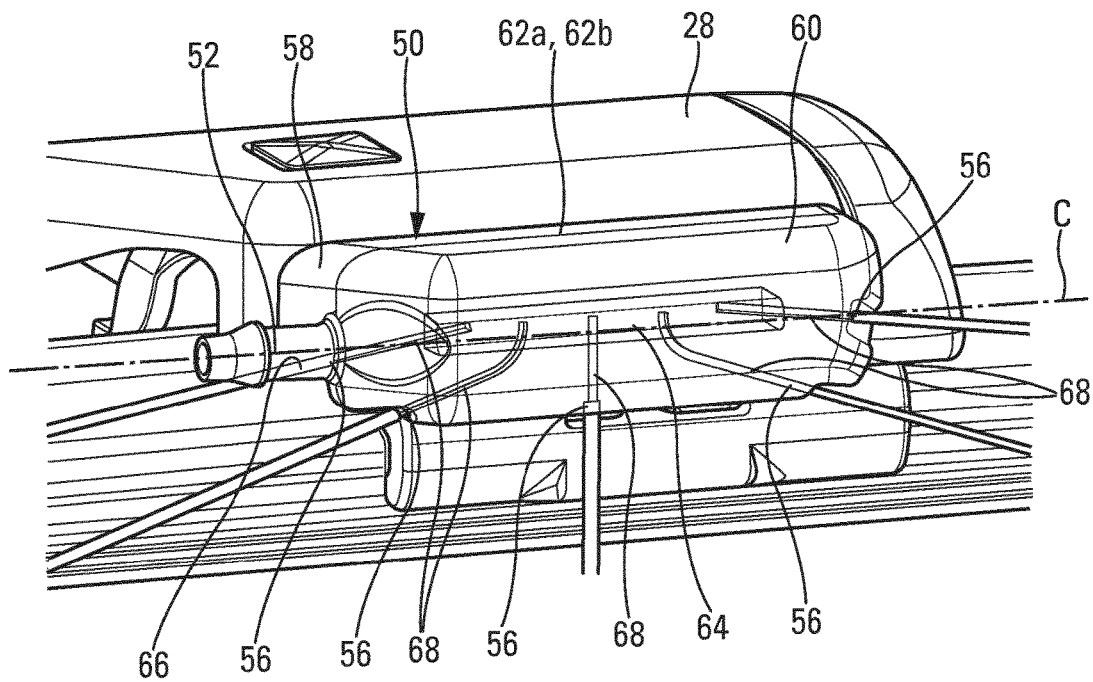
Figure 4:
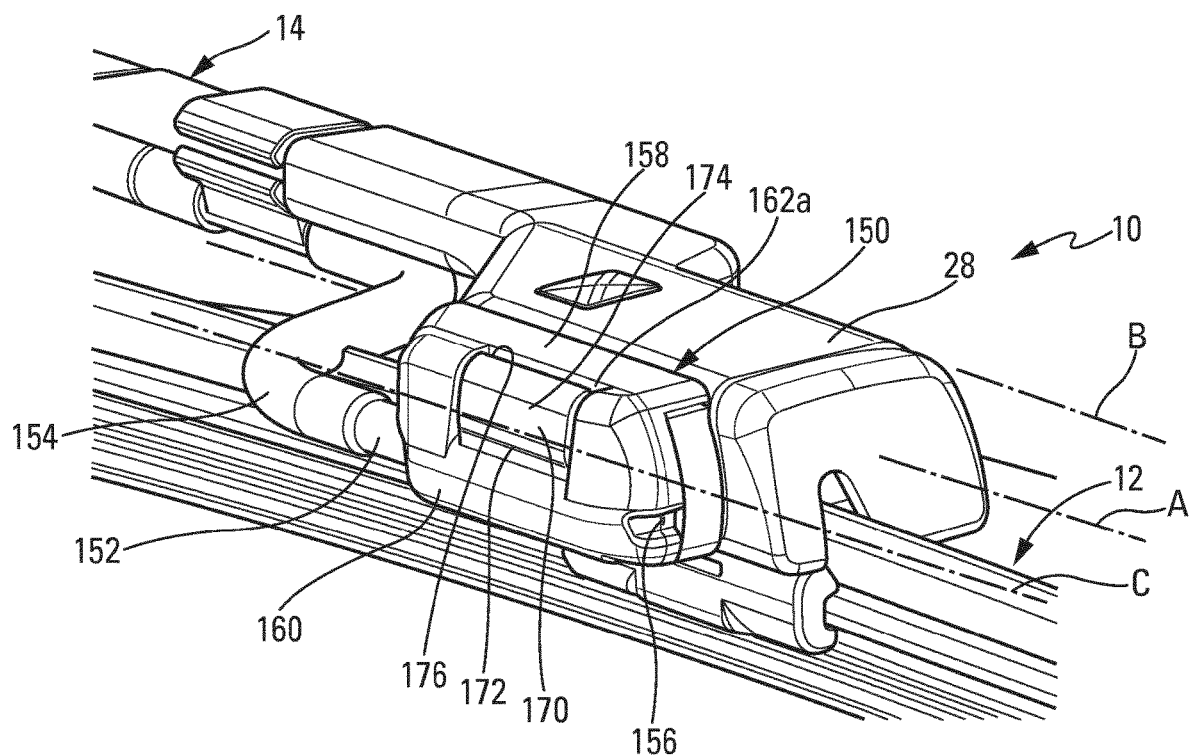
Figure 5:
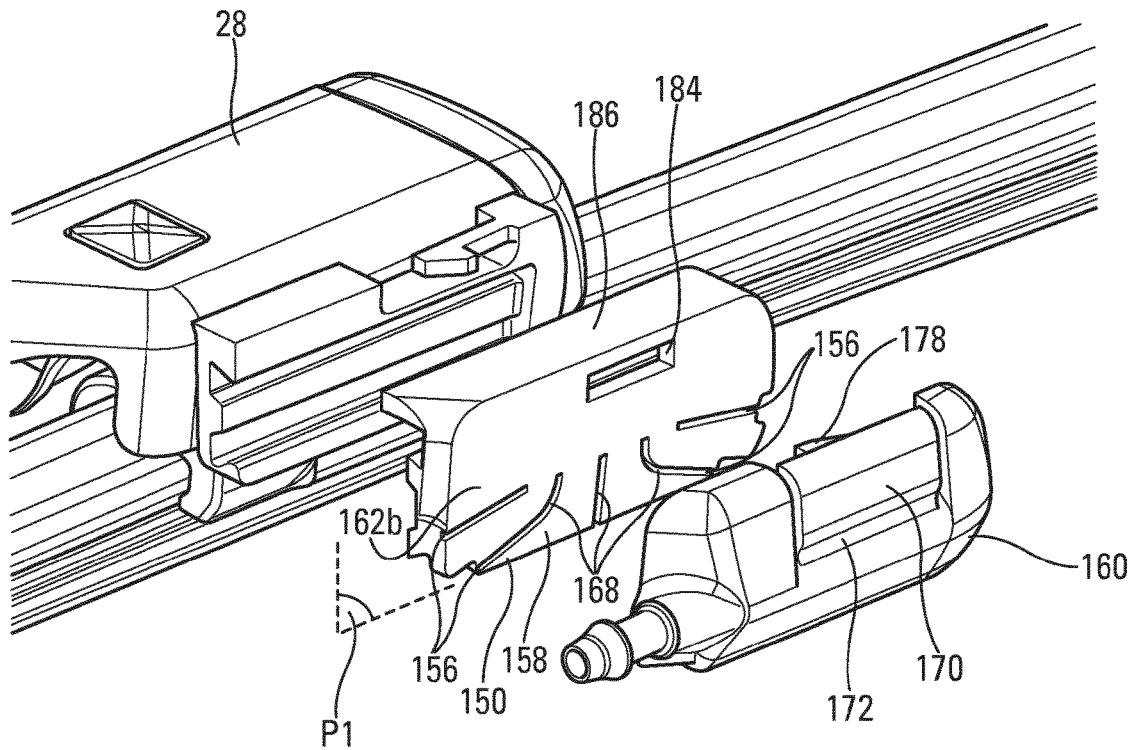
Figures 8A, 8B:
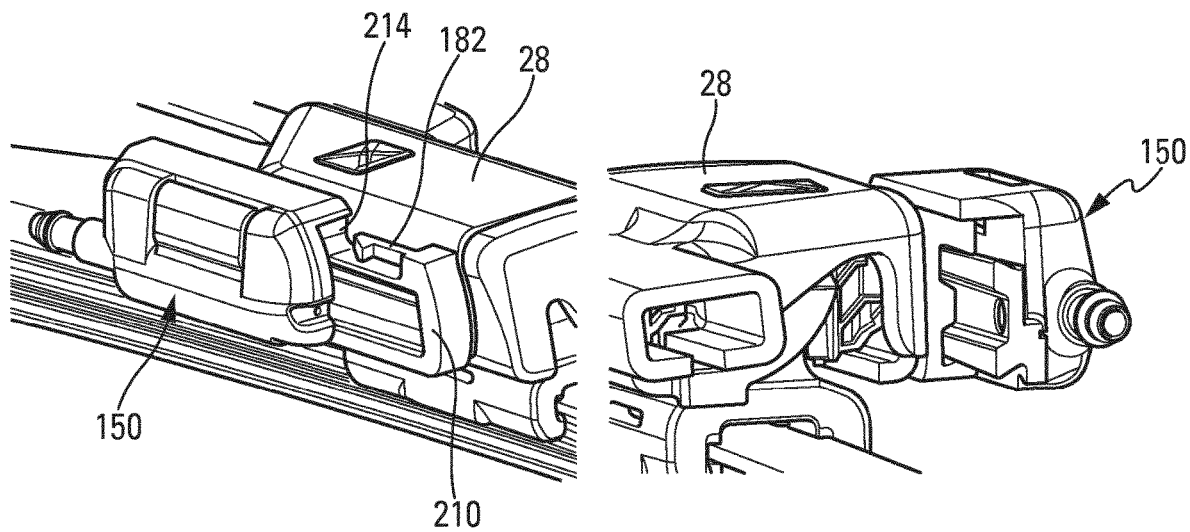
Figure 9:
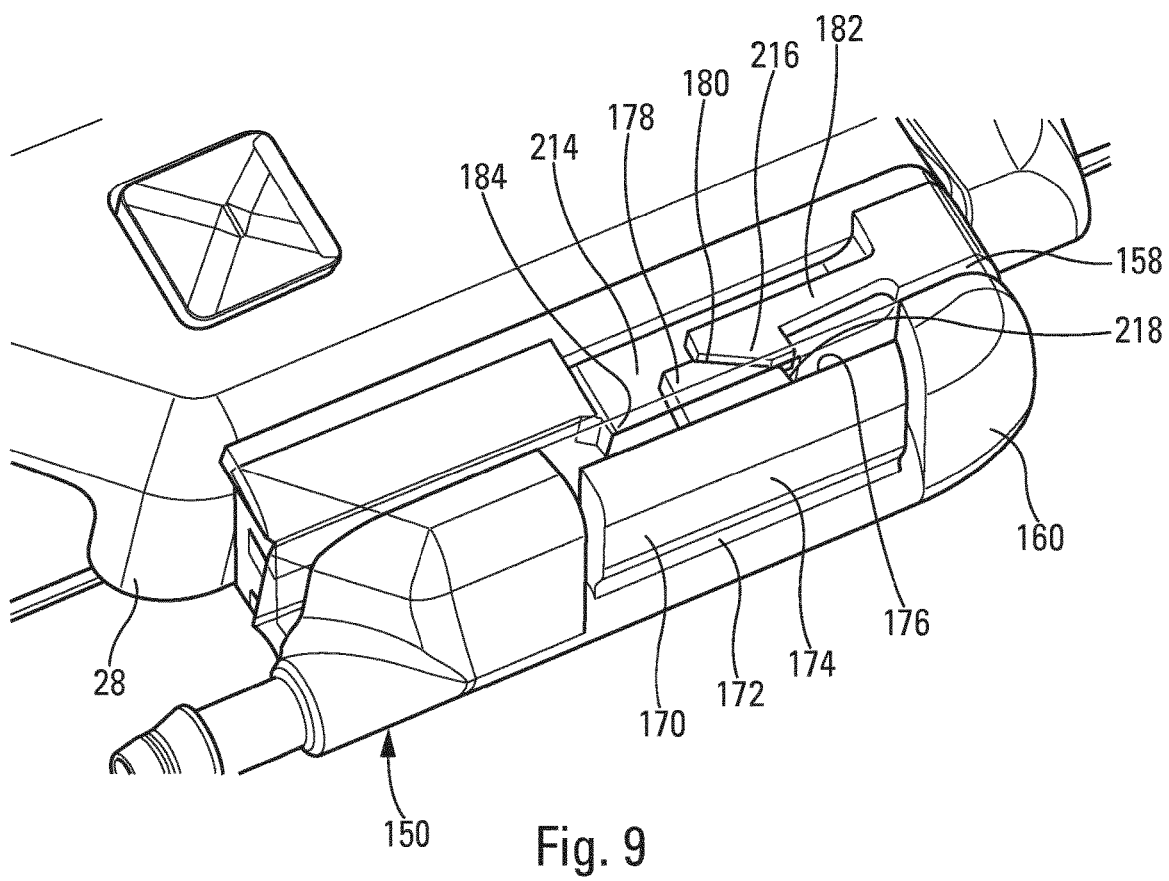
Figure 10:
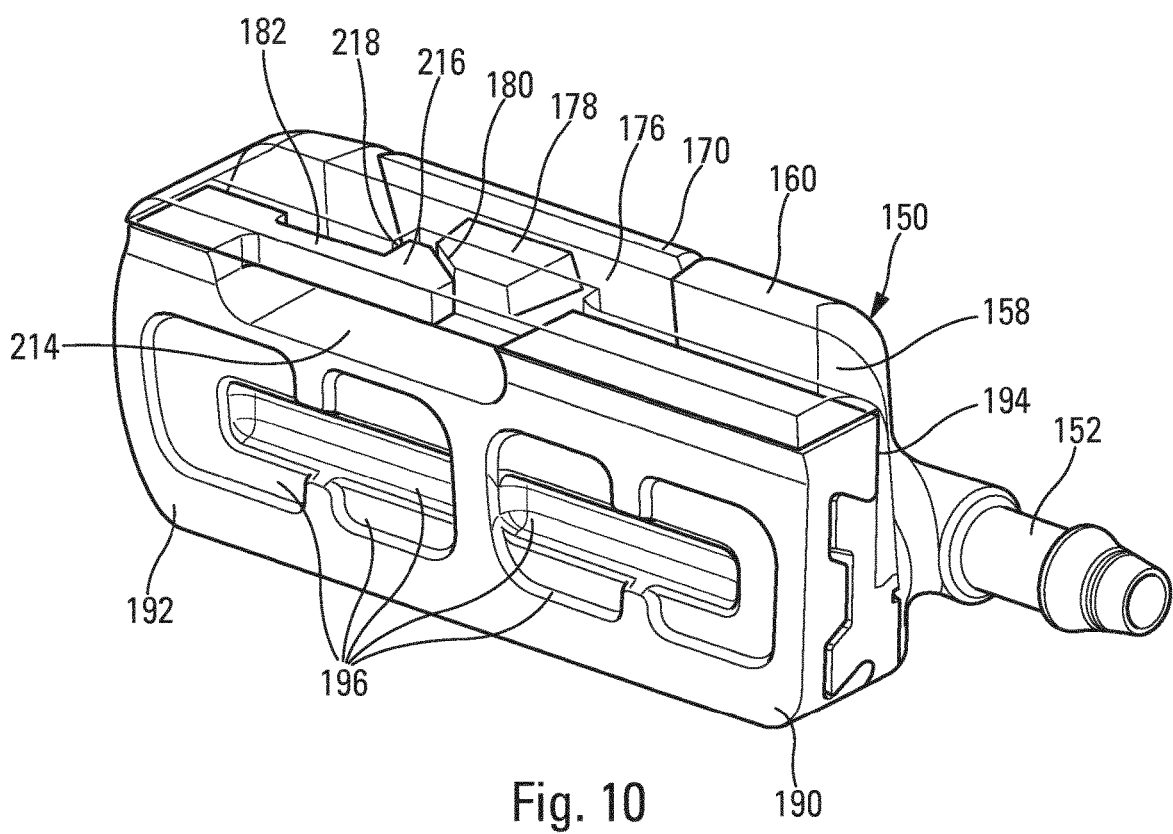
Figure 11:
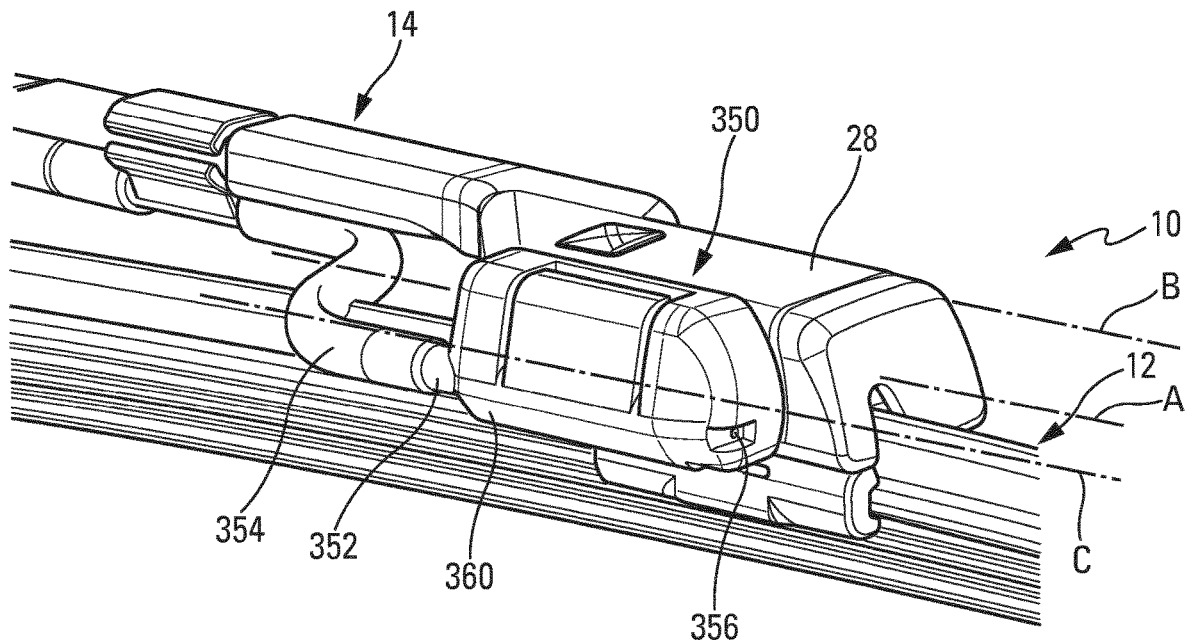
Figure 12:
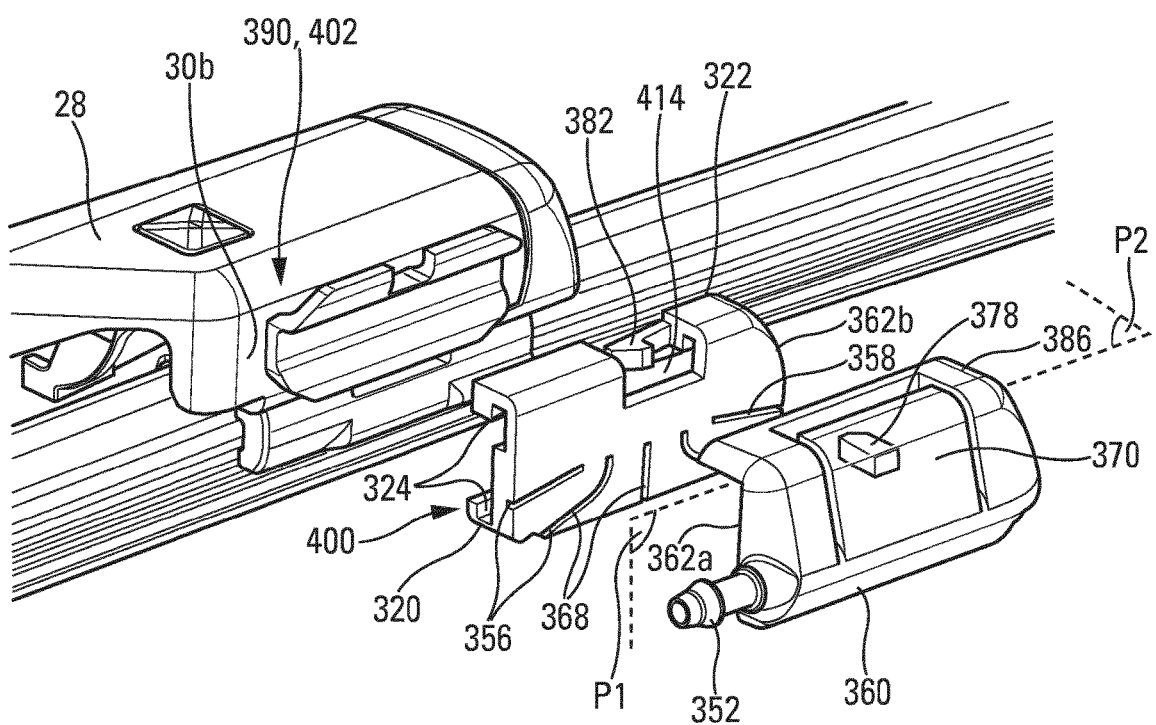
Figure 13:
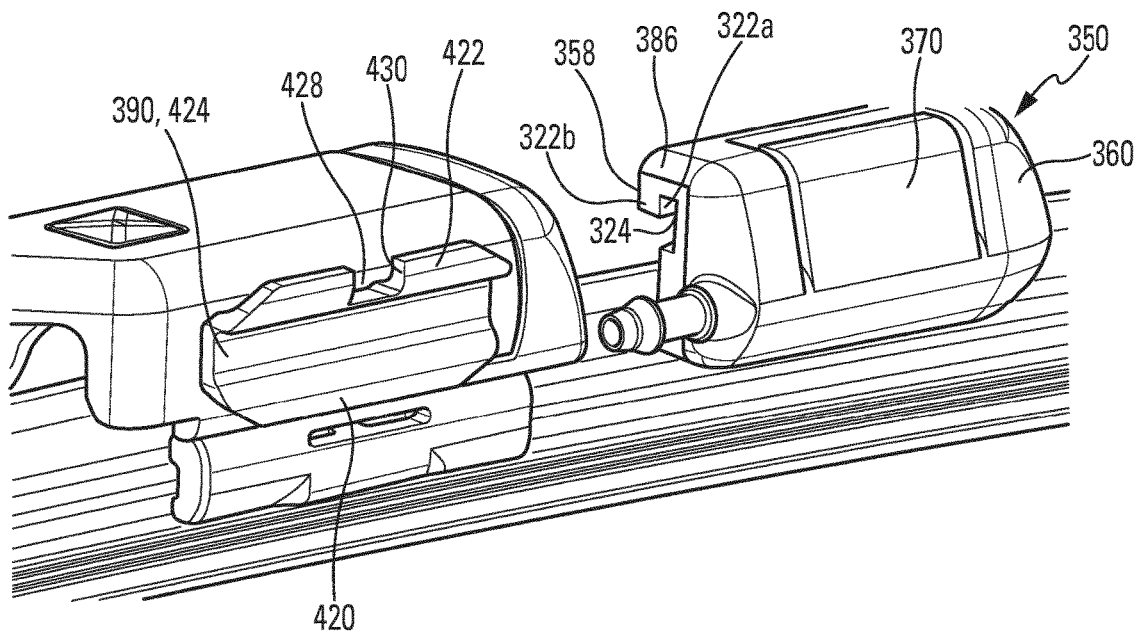
Figure 14:
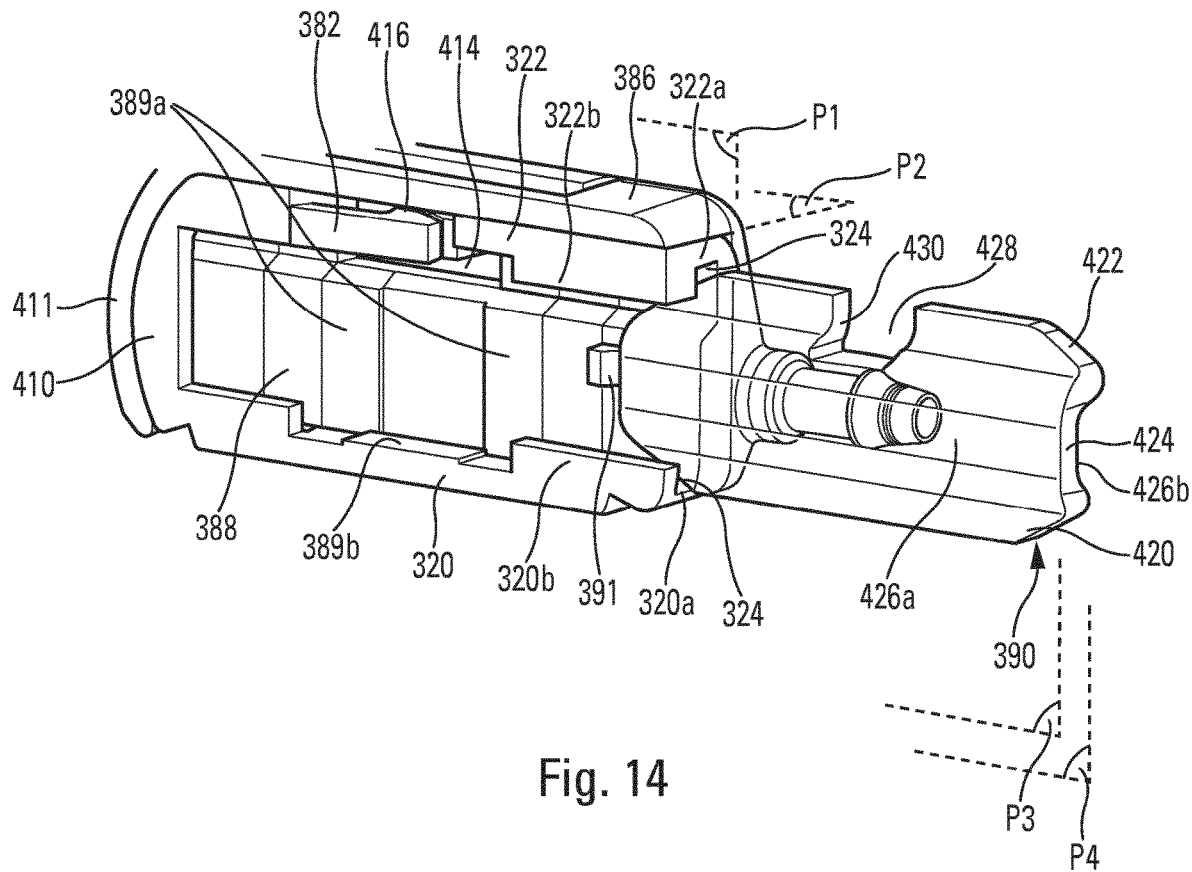
Figure 15:
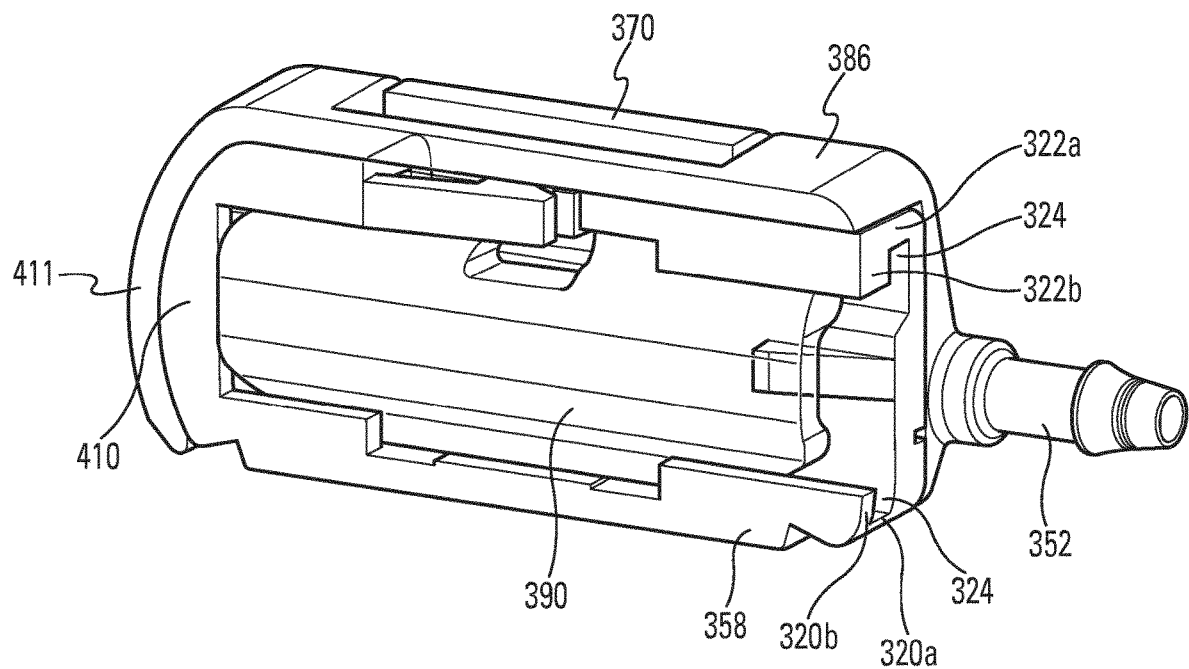
Figure 16:
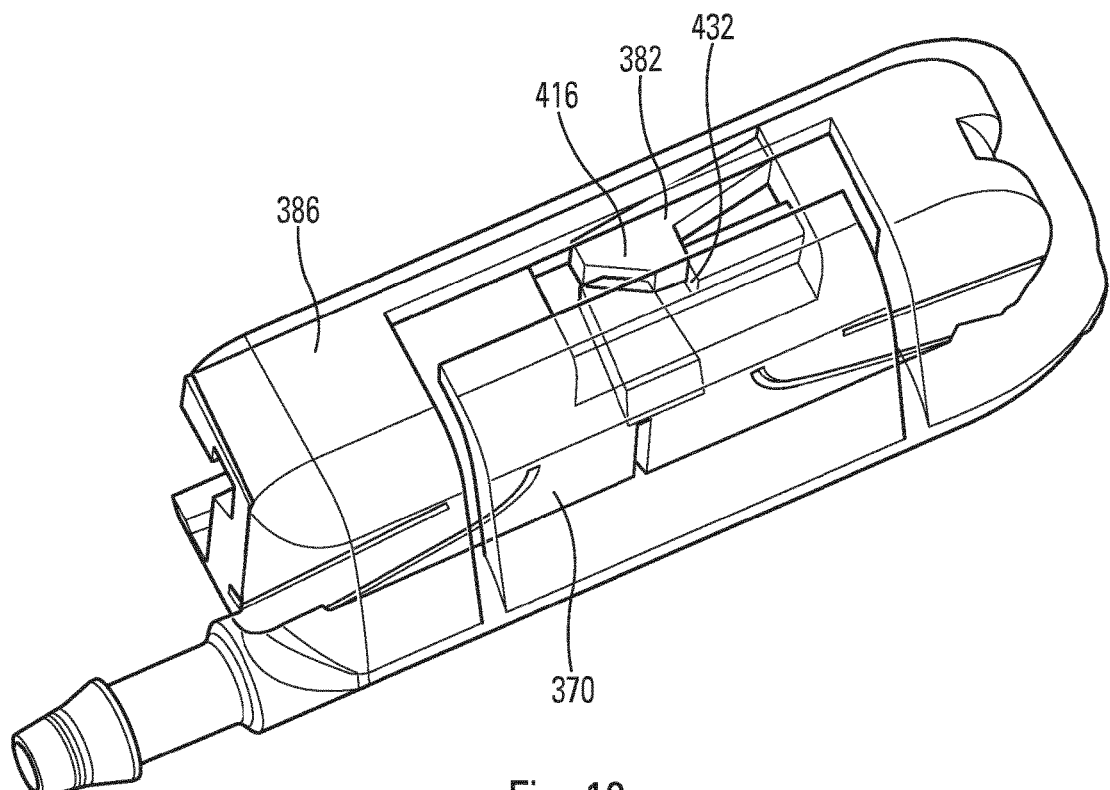
Figure 17:
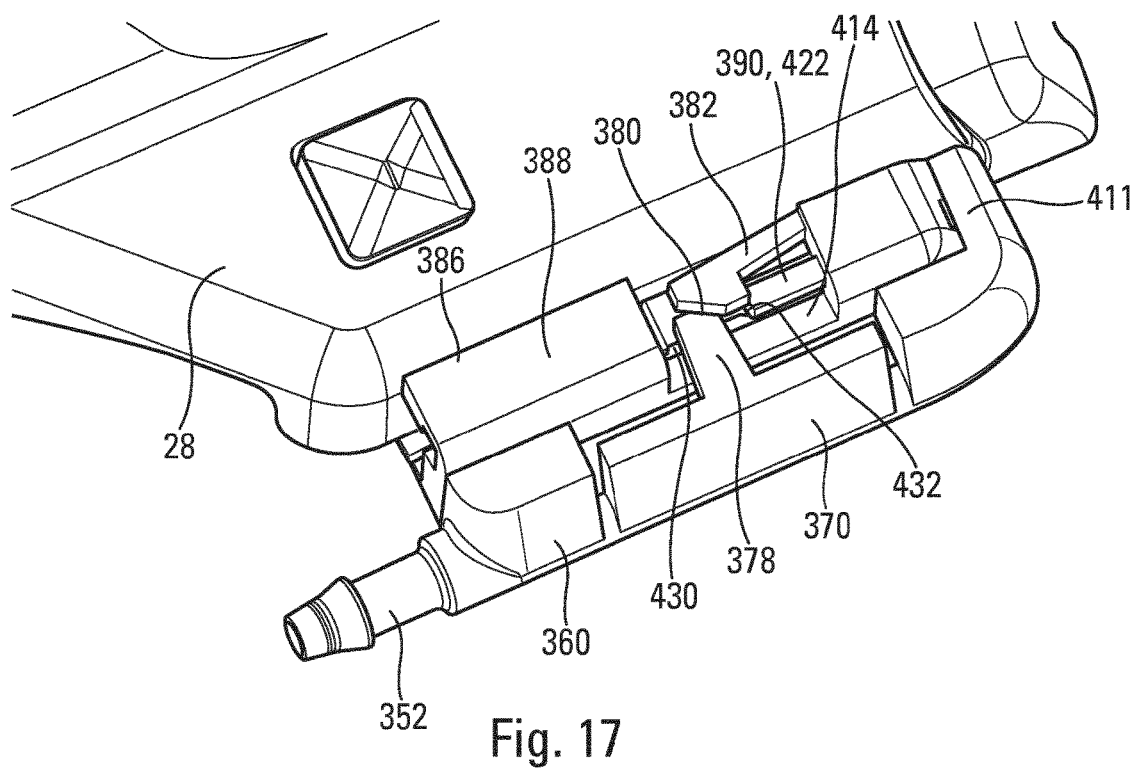
Figure 18:
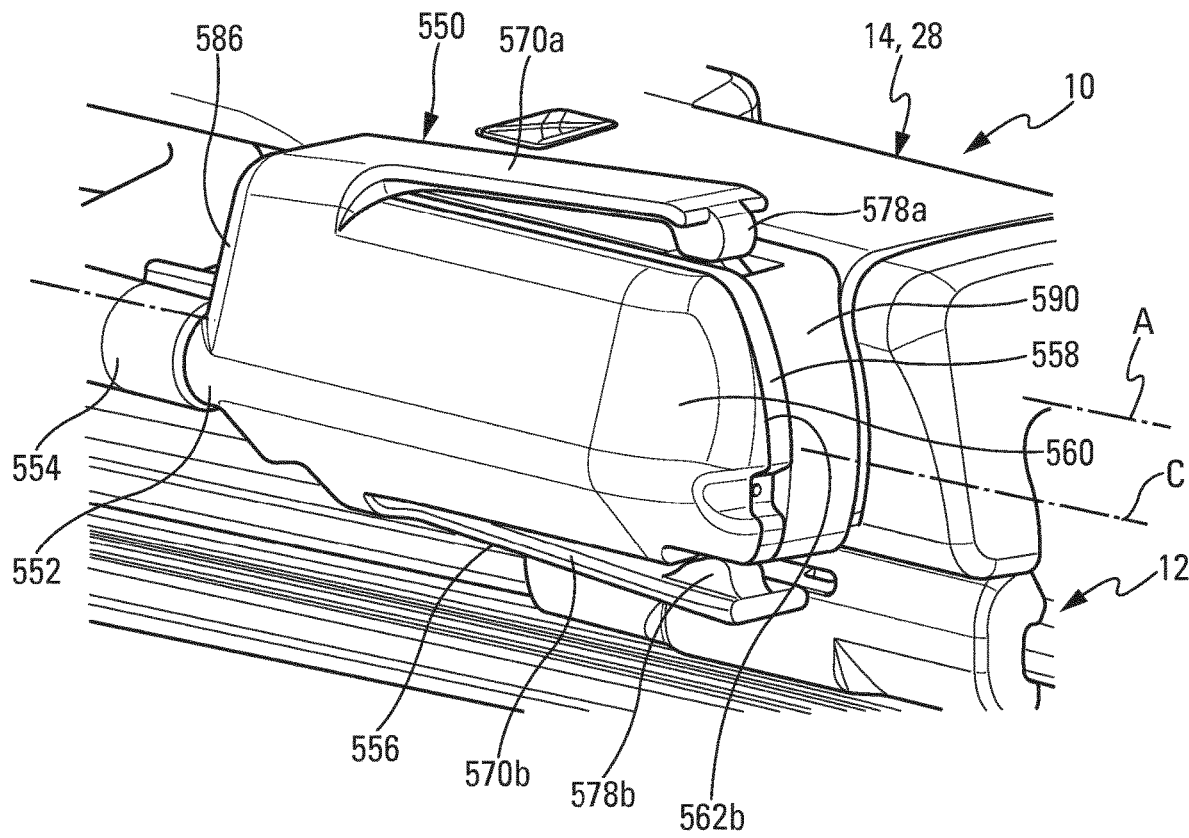
Figure 19:
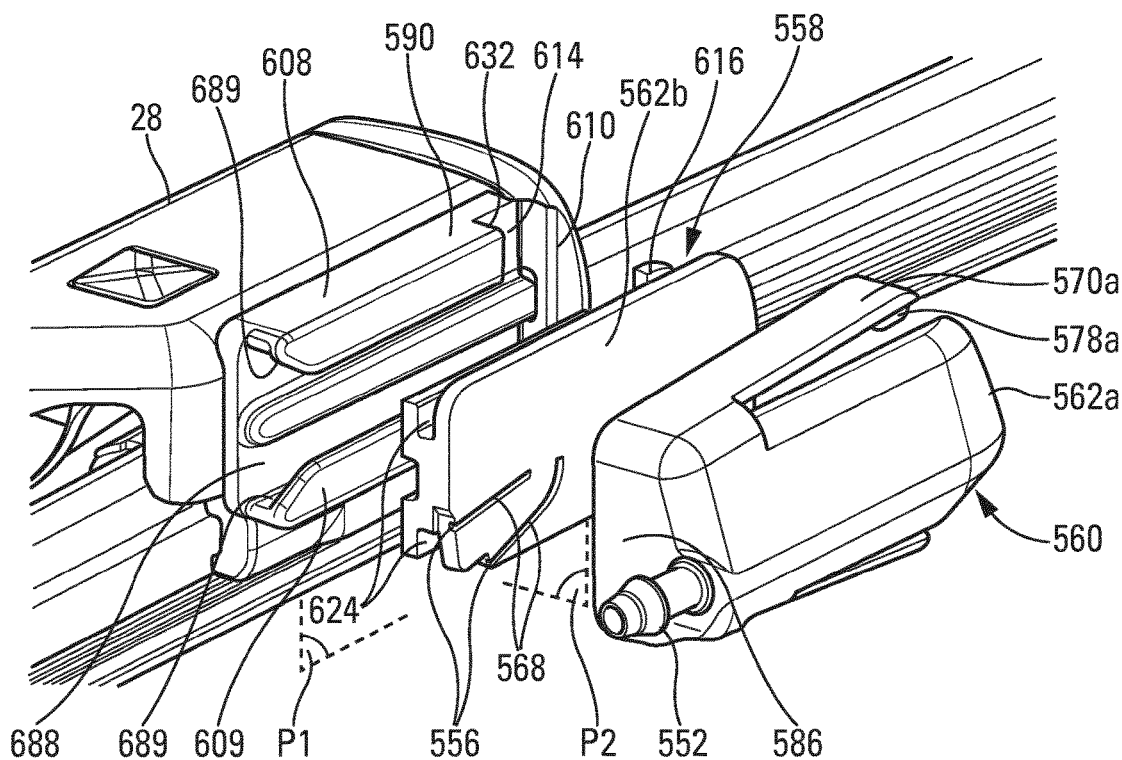
Figure 20:
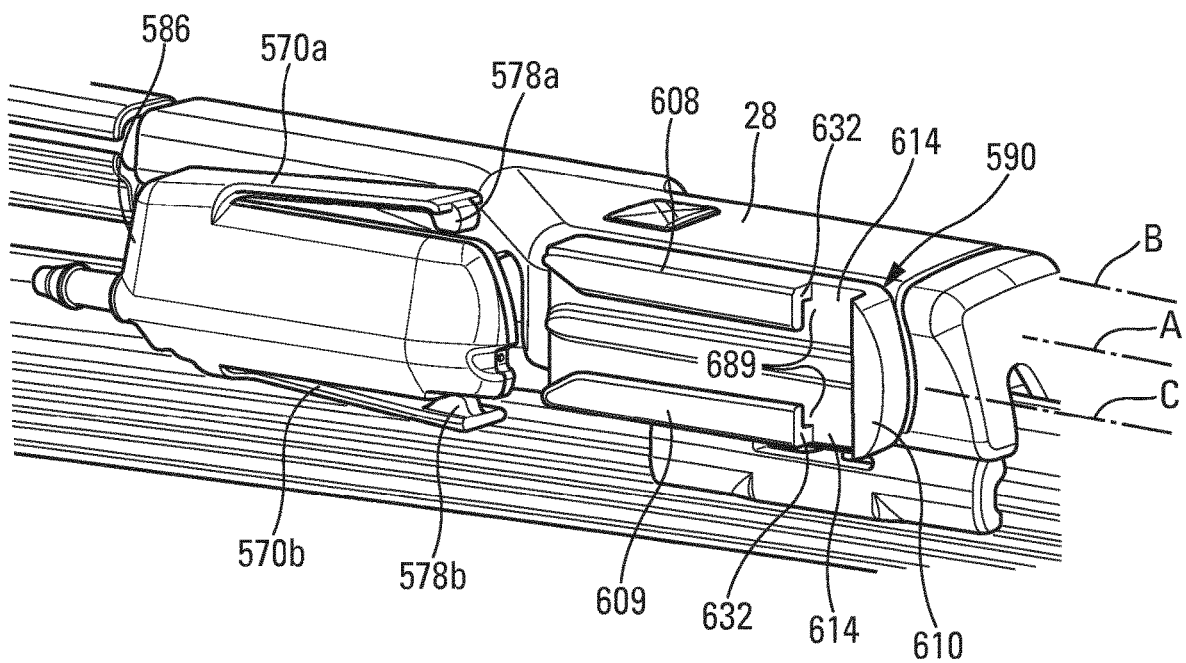
Figure 21:
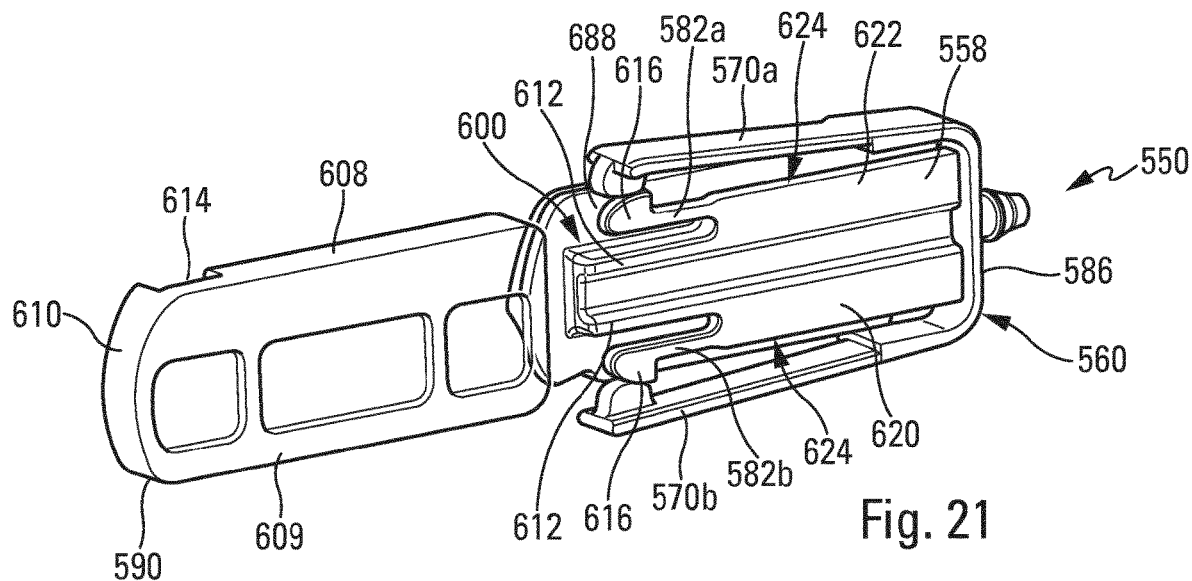
Figure 22:
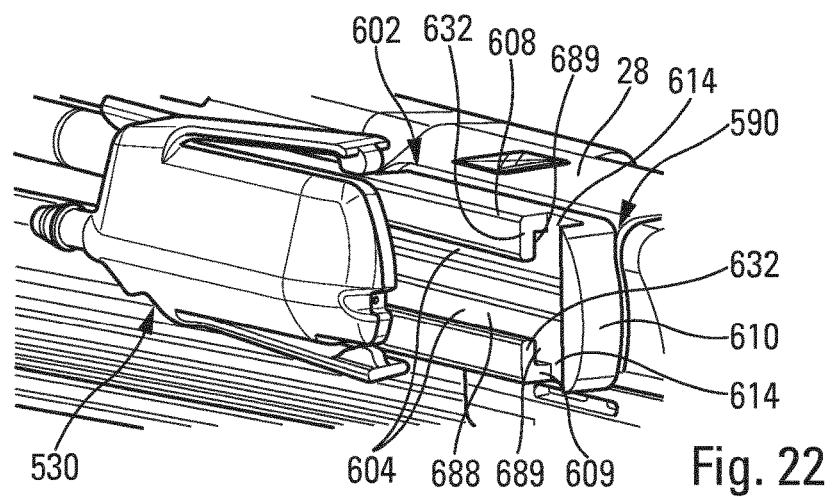
Figure 23:
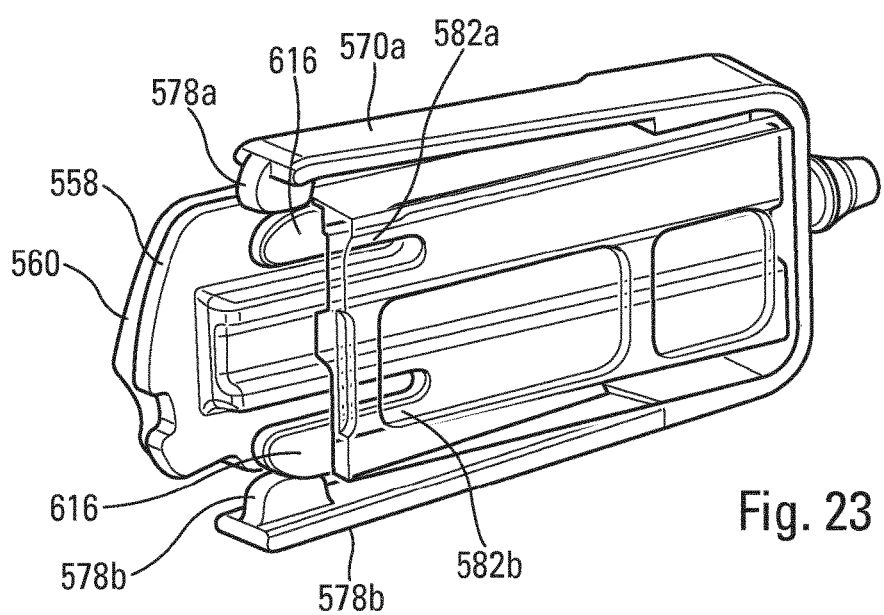

The invention will be better understood and other details, characteristics and advantages of the invention will appear on reading the following description which is given by way of a non-restricting example with reference to the accompanying drawings, in which:

FIG. 1 is a part schematic view in perspective of a window-wiper according to the invention, the arm of said window-wiper comprising a spray nozzle according to an embodiment of the invention, FIG. 2 is another schematic view in perspective of the window-wiper of FIG. 1, FIG. 3 is another schematic view in perspective of the window-wiper of FIG. 1, the channels of the spray nozzle being seen here transparently through the cover of the spray nozzle, FIG. 4 is a part schematic view in perspective of another window-wiper according to the invention, the arm of said window-wiper comprising a spray nozzle according to a realization variant of the invention, FIG. 5 is an exploded schematic view in perspective of the spray nozzle of the window-wiper of FIG. 4, FIGS. 6 to 9 are other schematic views in perspective of the window-wiper of FIG. 4 and show stages of the mounting of the spray nozzle, FIG. 10 is another schematic view in perspective of the spray nozzle of the window-wiper of FIG. 4, FIG. 11 is a part schematic view in perspective of another window-wiper according to the invention, the arm of said window-wiper comprising a spray nozzle according to a realization variant of the invention, FIG. 12 is an exploded schematic view in perspective of the spray nozzle of the window-wiper of FIG. 11, FIG. 13 is another schematic view in perspective of the window-wiper of FIG. 11 and shows a stage of the mounting of the spray nozzle, FIGS. 14 to 16 are schematic views in perspective of the spray nozzle of the window-wiper of FIG. 11, FIG. 17 is another schematic view in perspective of the window-wiper of FIG. 11, with partial removal of the spray nozzle, FIG. 18 is a part schematic view in perspective of another window-wiper according to the invention, the arm of said window-wiper comprising a spray nozzle according to a realization variant of the invention, FIG. 19 is an exploded schematic view in perspective of the spray nozzle of the window-wiper of FIG. 18, FIGS. 20, 22 and 24 are other schematic views in perspective of the window-wiper of FIG. 18 and show stages of the mounting of the spray nozzle, and FIGS. 21 and 23 are schematic views in perspective of the spray nozzle of the window-wiper of FIG. 18.

It must be noted that the figures describe the invention in a detailed manner so as to implement the invention, said figures obviously being able to be used for better defining the invention where appropriate.

In the following description, the designations longitudinal or lateral refer to the orientation of the window-wiper blade or of the drive arm. The longitudinal direction corresponds to the main axis of the wiper blade or of the arm in which it extends, whilst the side orientations correspond to intersections, that is to say which cross the longitudinal direction, notably perpendicular to the longitudinal axis of the wiper blade or of the arm in its rotation plane. For longitudinal directions, the designations outside or inside are assessed with regard to the fixing point of the wiper blade on the arm, the inside designation corresponding to the part where the arm and a half-blade extend, or with regard to the fixing point of the arm on the vehicle. Directions referenced as top or bottom correspond to perpendicular orientations in the rotation plane of the window-wiper blade, the designation bottom containing the plane of the windshield. Finally, the designation horizontal refers to a possible plane which is substantially parallel to the plane of the windshield, and the designation vertical refers to a possible plane which is substantially perpendicular to the plane of the windshield.

FIGS. 1 to 3 are referred to first of all showing a first embodiment of the invention.

FIG. 1 shows a window-wiper 10 according to the invention, this comprises notably a window-wiper blade 12 and an arm 14 for driving the blade 12.

The blade 12, shown in part, is preferably the "flat blade" type and includes a longitudinal body 16, a wiper strip 18, generally of rubber, and at least one vertebra which stiffens the strip (not visible) and promotes its application on a vehicle windshield.

The body 16 of the blade 12 can comprise a top aerodynamic deflector 20 which is intended to improve the operation of the wiping system, the aim of said deflector being to improve the action of the blade on the windshield and therefore the aerodynamic performance of the system.

The blade 12 can include, furthermore, connectors or clips for coupling the wiper strip 18 and the vertebra on the body 16, said clips being situated on each of the longitudinal ends of the body 16.

The blade 12 includes an intermediary connector 22 substantially at its center. An adaptor 24, which is connected to the arm 14, is mounted on the connector 22 so as to maintain a degree of freedom when pivoting about a pivot axis Y which is a transverse axis substantially perpendicular to the longitudinal axis of the blade 12. Said degree of freedom allows the blade 12 to pivot in relation to the arm 14 and thus allows the blade to follow the curvature of the windshield when it moves. The adaptor 24 can be disengaged from the arm 14 as a result of depressing a push-button 26.

The arm 14 is shown in part and is intended to be driven by a motor in order to follow an angled movement back and forth allowing the water and possibly other unwanted elements covering the windshield to be removed. The adaptor 24 ensures the connection between the blade 12 and the arm 14 and, in particular, a head or end part 28 of the arm which can be formed from one single part with the arm or can be positioned and fixed on the same.

The end part 28 of the arm forms a clevis with a substantially U-shaped cross section. The end part 28 includes two longitudinal side walls 30a, 30b, the top longitudinal edges of which are connected together by a top longitudinal wall 32. The walls 30a, 30b, 32 together delimit a space for accommodating the adaptor 24.

The top wall 32 includes an opening 34 which crosses the push-button 26 in a complementary manner. In the mounting position, the push-button 26 is accommodated in said opening 34 and its top face is substantially aligned with the top face of the wall 32. The push-button 26 is mounted in the opening 34 as a result of simple engagement or interlocking.

The end part 28 has an elongated form and the axis of elongation A thereof defines a longitudinal axis of the arm 14. The end part 28 includes a part 40 which connects to the rest of the arm 14, for example by crimping. Said part 40 has a general elongated form and extends along an axis B substantially parallel to the axis A and at a spacing from said axis, as can be seen in FIG. 2. The part 40 is connected to a first side wall 30a of the end part 28, at its inside end.

The side wall 30b of the end part is thus left free to receive a spray nozzle 50 according to the invention, which is preferably fixed on an external face of said wall 30b as a result of bonding or soldering.

As can be seen in the drawings, the spray nozzle 50 has an elongated form which is substantially parallelepipedal. The axis of elongation C of the spray nozzle 50 is substantially parallel to the axis A, the axes A, B and C being able to be coplanar, the common plane of which is substantially horizontal, that is to say parallel to the plane of the windshield.

The spray nozzle 50 includes a fluid inlet and projection openings. The fluid inlet is formed here by a male-type tube 52 which is engaged in an end of a flexible hose 54 which is borne by the arm 14 and which is connected to a pump and to a reservoir for vehicle washer fluid. The tube 52 extends here substantially parallel to the axis C.

The spray nozzle 50 includes several projection openings 56, here five. Each opening 56 allows the washer fluid to be sprayed in a given direction. The projection directions defined by the openings 56 are all different here. They are substantially coplanar in this case, the common plane of which is substantially vertical. Two openings 56 are oriented outward and are intended to project fluid onto specific impact zones of the windshield of the vehicle. One opening is oriented downward and is intended to project fluid onto an impact zone of the windshield situated substantially facing the spray nozzle 50 (FIG. 2). Two openings 56 are oriented inward and are intended to project fluid onto specific impact zones of the windshield.

The spray nozzle 50 includes here two parts which are mounted one on the other, namely a base 58 and a cover 60. The base 58 and the cover 60 each have an elongated form, the axes of elongation of which are substantially parallel to the axis C. Said parts are fixed together at a single joint plane P1 which, here, is substantially parallel to the axis C and also substantially vertical (FIG. 2).

The cover 60 includes one (here single) planar surface 62a at plane P1, which is intended to come to rest on one (here single) corresponding planar surface 62b of the base 58. The forms and dimensions of the surfaces are substantially identical.

The cover 60 includes a primary channel 64 which has a straight elongated form and extends along the axis C. Said primary channel 64 opens out onto the surface 62a over its entire length. It has a length which is less than that of the cover and is substantially formed in the center of the cover 60 such that said longitudinal ends are at a spacing from the longitudinal ends of the cover.

The tube 52 is borne here by the cover 60 and is formed of one single part with said latter. The tube 52 defines an internal passage 66, one end of which is connected to a longitudinal end of the primary channel 64.

In the mounting position, the base 58 closes the primary channel 64, part of the surface 62b of the base defining a bottom wall of the primary channel 64.

The primary channel 64 extends in a median plane substantially parallel to the joint plane P1.

The base 58 here includes five secondary channels 68 which each have an elongated form and are each connected to one of the aforementioned projection openings 56. The openings 56 are thus formed in the base and more precisely by the outlets of the secondary channels 68 on the periphery of the base. Three of the channels 68 are substantially straight. These are the ones connected to the middle opening 56 and to the end openings 56. The two other (intermediary) channels 68 have a general curved form.

Each secondary channel 68 opens out over its entire length onto the surface 62b. The openings 56 and the channels 68 are situated here on a bottom middle part of the base 58. Each secondary channel 68 extends over more than half the height of the base 58. The top longitudinal ends of the channels 68 are situated substantially in a same plane passing through the axis C and substantially parallel to the windshield.

In the mounting position, said ends open out into the primary channel 64 of the cover 60 so as to communicate fluidically with said latter. With the exception of said ends of the channels 68, the cover 60 closes the channels 68, part of its surface 62a defining the bottom walls of said channels.

The secondary channels 68 extend in a median plane substantially parallel to the joint plane P1.

The base 58 and the cover 60 can be realized in plastics material, for example as a result of injection molding.

The base 58 and the cover 60 are preferably fixed together by bonding. The base 58 is positioned and fixed, for example by bonding or soldering, on the external face of the side wall 30b of the end part 28.

When mounting the spray nozzle 50, the base 58 and the cover 60 are fixed together then the base is fixed on the end part 28 of the arm. The hose 54 is therefore connected to the tube 52 so as to supply the spray nozzle 50 with washer fluid. The fluid passes through the passage 66 of the tube 52 and arrives in the primary channel 64 in order then to supply the different secondary channels 68. The fluid is then projected through the openings 56 onto several impact zones of the windshield as described above.

FIGS. 4 to 10 are now referred to showing a realization variant of the invention. The description above in relation to the blade 12 and to the arm 14 of the window-wiper 10 applies to said variant.

The spray nozzle 150 has an elongated form which is substantially parallelepipedal. The axis of elongation C of the spray nozzle 150 is substantially parallel to the axis A, the axes A, B and C being able to be coplanar, as indicated above.

The spray nozzle 150 includes a fluid inlet and projection openings. The fluid inlet is formed here by a male-type tube 152 which is engaged in an end of a flexible hose 154 which is borne by the arm 14 and which is connected to a pump and to a reservoir for vehicle washer fluid. The tube 152 extends here substantially parallel to the axis C.

The spray nozzle 150 includes several projection openings 156, here five. Each opening 156 allows the washer fluid to be sprayed in a given direction. The projection directions defined by the openings 156 are all different here, as explained above in relation to the first embodiment.

The spray nozzle 150 includes here two parts which are mounted one on the other, namely a base 158 and a cover 160. The base 158 essentially includes all the characteristics of the base 58 described above and includes other characteristics which will be described below. In the same way, the cover 160 essentially includes all the characteristics of the cover 60 described above and includes other characteristics which will be described below.

The cover 160 includes here an actuating means which is in the form of a push-button 170. Said push-button 170 is formed of a single part with the cover 160 and defines part of the external cowling of said cover. The push-button 170 is situated here on a top middle part of the cover 160 and substantially in the center of the same in the longitudinal direction. It thus extends above the primary channel formed in the cover 160 and described above, in relation to the preceding embodiment (the primary channel of said preceding embodiment is designated by the reference 64 in FIG. 3).

The pivoting movements of the push-button 170 take place in a substantially vertical plane, perpendicular to the axis C.

The push-button 170 has a form here which is generally parallelepipedal and relatively planar. It extends in a plane that is substantially vertical and parallel to the axis C. It includes an external side face 174 defining part of the external cowling of the cover 160 and an internal side face 176 which is intended to be opposite part of the surface 162b of the base 158 which extends in the joint plane P1.

The push-button 170 is connected to the rest of the cover 160 by a thin film in material forming a hinge 172 which allows the button to pivot about an axis substantially parallel to the axis C. Said hinge 172 extends here along a bottom longitudinal edge of the button 170. The button 170 can be moved by pivoting between a rest position, shown in the drawings and in which its external side face 174 is substantially aligned in the longitudinal direction with the rest of the cowling of the cover 160, and a depressed position in which said cowling and the face 174 of the button 170 are no longer aligned.

The push-button 170 bears an actuating finger 178. Said finger 178 juts out from the internal face 176 of the button (FIGS. 9 and 10). It extends in a plane that is substantially perpendicular to the plane of the button, and therefore in a substantially horizontal plane. The form of the finger 170 is generally parallelepipedal. Its free end, situated on the opposite side to the button 170, is beveled in order to form a ramp 180 for pressing on an elastically deformable tab 182 which is borne by the base 158 and which will be described in more detail below.

In addition to the characteristics of the base 58, the base 158 includes a through-bore 184 for the accommodation and passage of the actuating finger 178 of the cover 160, as can be seen notably in FIG. 9. Said bore 184 is situated on a top middle part of the base 158, at a spacing from its secondary channels 168 (FIG. 5).

The base 158 has a substantially L-shaped form here in cross section and includes a main body similar to the base 58 of the preceding embodiment, and is connected at its top end to a substantially perpendicular longitudinal wall 186. The body of the base 158 thus has a substantially vertical orientation whilst its wall 186 has a substantially horizontal orientation.

The body of the base 158 includes a first external side face defining the aforementioned surface 162b and an internal side face 188 situated on the side of the end part 28 of the arm. As can be seen notably in FIG. 7, the bore 184 passes through the body of the base 158 and comes out on the surface 162b and the face 188, the outlet of the bore 184 situated on the face 188 being situated under the wall 186.

In contrast to the preceding embodiment, the spray nozzle 150 here is positioned and fixed on the end part 28 of the arm by means of a mounting bracket 190 which allows the spray nozzle 150 to be removed for the purpose, for example, of replacing it during a maintenance operation.

The mounting bracket 190 has a general elongated form along the axis C. Its form is substantially parallelepipedic.

The mounting bracket 190 is intended to be inserted between the fixing part 28 on which it is fixed and the spray nozzle 150. The mounting bracket 190 includes an internal face 192, situated on the side of the part 28, and intended to be applied and fixed on the external face of the aforementioned side wall 30b of the part 28, and an external side face 194 on which are provided the means for removably fixing the spray nozzle 150.

The mounting bracket 190 here includes, on its internal face 192, cavities 196 which are intended to facilitate the fixing of the bracket on the end part 28, for example as a result of bonding or soldering (FIG. 10). The cavities 196 can receive, for example, an amount of adhesive in order to improve the anchoring of said adhesive in relation to the mounting bracket 190.

The means for fixing the spray nozzle 150 to the mounting bracket 190 here are of the rail and slider type, a rail 200 being borne by the base 158 and cooperating with a slider 202 which is borne by the mounting bracket 190. The reverse is naturally conceivable.

The slider 202 is provided on the external face 194 of the mounting bracket 190, which is formed here of a single part with said slider 202. The slider 202 includes two straight recesses 204 which are substantially parallel together and to the axis C. They are arranged side by side and are separated from one another by a middle rib 206 which is also straight. Each recess 204 is bordered on one side by said middle rib 206 and on the other side by a top 208 or bottom 209 straight edge. The inside longitudinal ends of the recesses 204 are protruding or open whilst their outside longitudinal ends are closed by a transverse edge 210, as can be seen in FIGS. 8a and 8b. Said edge 210 connects the edges 208, 209.

Figure 7:
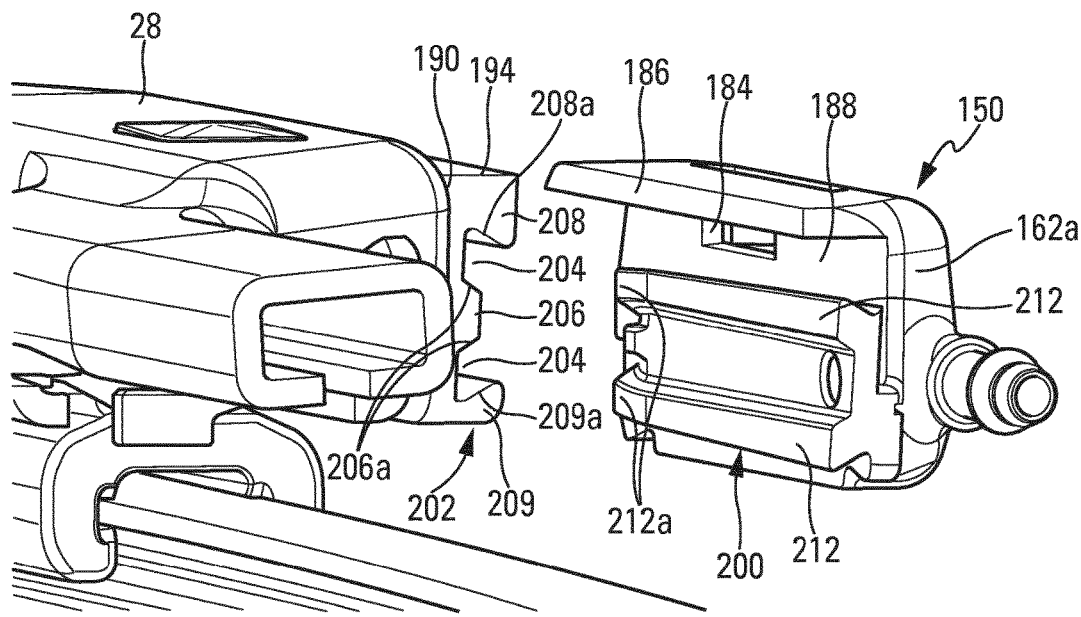

The middle rib 206 includes sloping side flanks 206a which converge in the transverse direction on the side of the spray nozzle 150 (FIG. 7). Each edge 208, 209 includes a flank 208a, 209a, facing a flank 206a of the middle rib 206 which is substantially parallel to said flank. The flanks 208a, 209a of the edges therefore also converge in the transverse direction on the side of the spray nozzle 150 (FIG. 7).

The rail 200 is positioned and fixed here on the face 188 of the base 158 but could be formed of one single part with said face. The rail 200 includes two straight ribs 212 which are substantially parallel to one another and to the axis C. They are arranged side by side and are dimensioned and spaced so as to be able to cooperate with the recesses 204 of the slider 202 of the mounting bracket 190. They are intended to be engaged with a small clearance, perhaps with a tight fit, in said recesses 204. They therefore have forms that are complementary to those of the recesses 204 and here are substantially diverging in the transverse direction on the side of the end piece 28. This allows the spray nozzle 150 to be retained in relation to the bracket 190, in the transverse direction on the side opposite to the arm.

The outside longitudinal ends 212a of the ribs 212 are beveled in order to facilitate insertion of the ribs into the recesses 204, as is shown in FIGS. 6, 7, 8a and 8b. Said ends 212a can be configured to abut against the transverse edge 210 of the bracket 190 so as to define an end position of the spray nozzle 150 in relation to the bracket 190. The cooperation between said ends 212a and the edge 210 ensures, furthermore, that any translational movement of the spray nozzle 150 along the axis C is blocked, on the side opposite the tube 152, that is to say outward.

Figure 6:
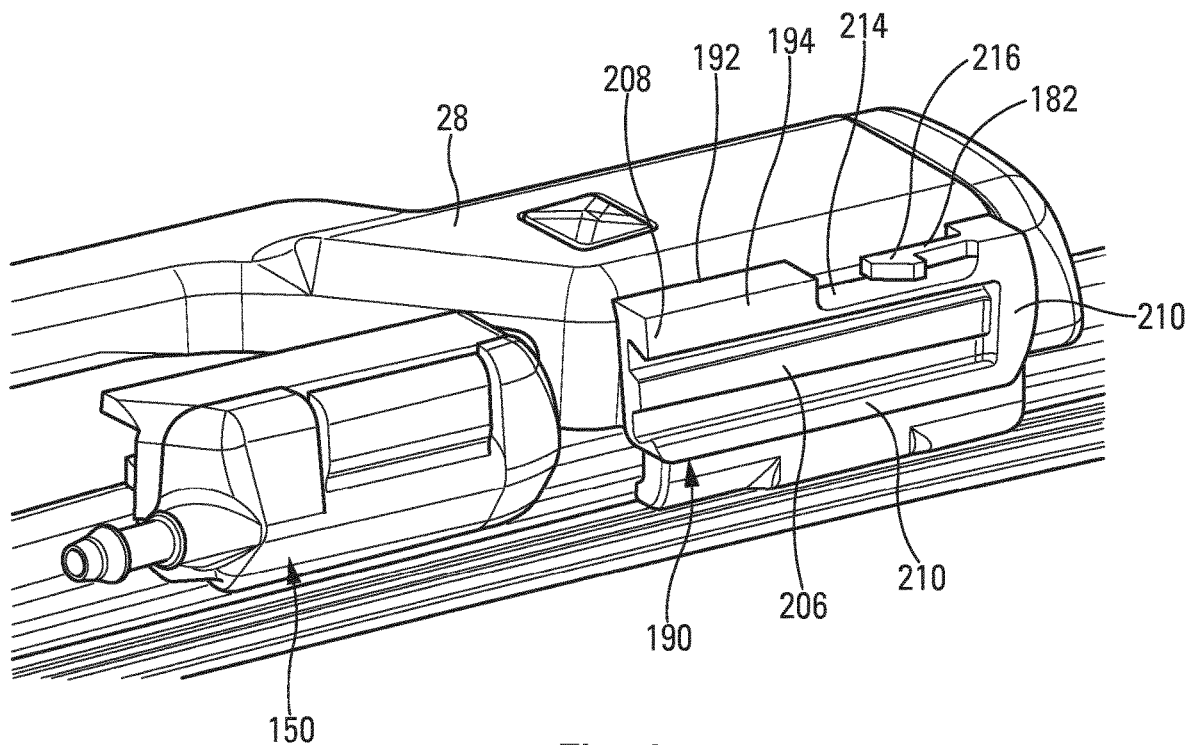

As can also be seen in FIGS. 6 and 7, the top edge 208 is intended to be covered by the top wall 186 of the spray nozzle 150 in the mounting position (FIGS. 7 to 10). The edge 208 includes a top face along which the wall 186 of the base 158 is able to cooperate by sliding.

The top edge 208 is over-dimensioned, in particular in the transverse direction, in order to be able to form the aforementioned elastically deformable tab 182 there. The edge 208 includes a top hollow 214 in which the tab 182 is situated. The hollow 214 has an elongated form along the axis C. The tab 182 also has an elongated form along the axis C and includes an outside longitudinal end for connection to the rest of the mounting bracket 190 and a free inside longitudinal end on which a coupling tooth 216 is provided. The tooth 216 juts out from said end and extends in a substantially horizontal plane, on the side of the spray nozzle 150. The tooth 216 has an inside longitudinal end which is beveled and which is intended to cooperate with the ramp 180 of the finger 178 of the push-button 170, as can be seen in FIGS. 9 and 10. As can also be seen in said figures, the tooth 216 is configured in order to be coupled with the base 158 coming to rest on or at least face a longitudinal end 218 of the bore 184 of the base 158. In said position, the tooth 216 retains the spray nozzle 150 which is prevented here from moving translationally along the axis C, on the side of the tube 152, that is to say inward.

It can also be seen that the finger 178 and the tab 182 are substantially in a same horizontal plane (FIGS. 9 and 10). The tab 182 is elastically deformable, in particular in a flexural manner, in said horizontal plane, from a free position substantially without constraint shown in the figures, into a flexed or deformed position toward the end piece 28, in which its tooth 216 is no longer resting on or facing the end 218 of the bore 184 and no longer ensures the spray nozzle 150 is retained in relation to the bracket 190 along the axis C.

As can be seen in FIGS. 9 and 10, due to the covering of the edge 208 of the bracket 190 by the wall 186 of the base 158, the tab 182 of the bracket 190 is not visible from the outside and is protected. It is thus not possible to access said tab 182 directly, its actuation only being possible by selecting the push-button 170.

The base 158 and the cover 160 can be realized in plastics material, for example as a result of injection molding.

The mounting of the spray nozzle 150 of FIGS. 5 to 10 can be realized in the following manner. The base 158 and the cover 160 are fixed together then the hose 154 is connected to the tube 152 so as to be able to supply the spray nozzle 150 with washer fluid. The spray nozzle 150 is arranged as shown in FIGS. 6 and 7, so as its longitudinal axis C is substantially parallel to that of the mounting bracket 190 and the ribs of the rail 200 are ready to be inserted into the recesses 204 of the slider 202 of the bracket 190. The spray nozzle is then made to slide along the base along the axis C, outward. The face 188 and the wall 186 of the base 158 cooperate respectively with the face 194 and the edge 208 in order to facilitate and guide said sliding movement. The sliding movement is realized until the spray nozzle 150 comes to rest, for example, by way of the outside longitudinal ends 212a of its ribs 212, on the transverse edge 210. Just before reaching said position, the face 188 of the spray nozzle comes to rest on the tooth 216 of the tab 182 which is deformed elastically in a flexural manner toward the end piece 28. When the aforementioned position is reached, the tooth 216 can engage in the bore 184 of the base 158 and the tab 182 resumes a position without constraint shown in the drawings. The spray nozzle 150 is therefore locked on the mounting bracket 190. Washer fluid can pass through the internal passage of the tube 152 and arrive in the primary channel of the cover 160 in order then to supply the different secondary channels 168 of the base 158. The fluid is then projected through the openings 156 onto several impact zones of the windshield as described above.

FIGS. 11 to 17 are now referred to showing another realization variant of the invention. The above description relating to the blade 12 and to the arm 14 of the window-wiper 10 is applicable to said variant.

The spray nozzle 350 has an elongated form which is substantially parallelepipedal. The axis of elongation C of the spray nozzle 350 is substantially parallel to the axis A, the axes A, B and C being able to be coplanar, as indicated above.

The spray nozzle 350 includes a fluid inlet and projection openings 356. The fluid inlet is formed here by a male-type tube 352 which is engaged in an end of a flexible hose 354 which is borne by the arm 14 and which is connected to a pump and to a reservoir for vehicle washer fluid. The tube 352 extends here substantially parallel to the axis C.

The spray nozzle 350 includes several projection openings 356, here five. Each opening 356 allows the washer fluid to be sprayed in a given direction. The projection directions defined by the openings 356 are all different here, as explained above in relation to the first embodiment.

The spray nozzle 350 includes here two parts which are mounted one on the other, namely a base 358 and a cover 360. The base 358 essentially includes all the characteristics of the base 158 described above and includes other characteristics which will be described below. In the same way, the cover 360 essentially includes all the characteristics of the cover 160 described above and includes other characteristics which will be described below.

The cover 360 has a substantially L-shaped form here in cross section and includes a main body which is similar to the cover 160 described above and which includes the push-button 370, said main body being connected at its top end to a longitudinal wall 386 which is substantially perpendicular to the main body. The body of the cover 360 thus has an orientation which is substantially vertical whilst its wall 386 has an orientation which is substantially horizontal.

The body of the cover 360 includes an internal side face 362a defining a first joint plane P1 (with the external side face 562b of the base 558), and the wall 386 includes a bottom surface defining a second joint plane P2. The base 358 and the cover 360 are thus fixed together at the two joint planes P1, P2, which are substantially perpendicular here.

In addition to the characteristics of the base 158, the base 358 includes here two longitudinal edges, respectively the bottom edge 320 and the top edge 322 which are substantially parallel and which extend here toward the end piece 28 of the arm. Each edge 320, 322 has a substantially L-shaped form in section and includes a substantially horizontal first part 320a, 322a, an external longitudinal edge of which is connected to the rest of the base 358 and therefore an internal longitudinal edge is connected to a top longitudinal edge of a second substantially vertical part 320b, 322b of the edge (FIG. 14). The parts 320b, 322b are substantially coplanar and extend toward one another (FIG. 12). Each of said parts 320*b*, 322*b* extends at a (transverse) spacing from the internal side face 388 of the base 358 in order to define a longitudinal groove 324 with said face. Said parts 320*b*, 322*b* replace the ribs 212 of the preceding realization variant and form a rail 400 in the sense of the invention.

The outside longitudinal ends of the edges 320, 322 are connected together by a transverse edge 410, as can be seen in FIGS. 14 and 15. As can also be seen in said figures, the cover 360 includes a transverse edge 411 at its outside longitudinal end which is intended to cover the transverse edge 410 of the base. The edges 410, 411 could be fixed together to improve the mounting of the spray nozzle 350 which, here, will therefore not have a supplementary joint plane but supplementary joint curved surfaces.

The top edge 322 bears an elastically deformable tab 382 which has a function similar to the tab 182 described above. The edge 322 includes a top hollow 414 in which the tab 382 is situated. The hollow 414 has an elongated form along the axis C. The tab 382 also has an elongated form along the axis C and includes an outside longitudinal end for connection to the rest of the mounting bracket and a free inside longitudinal end on which a coupling tooth 416 is provided. The tooth 416 juts out from said end and extends in a substantially horizontal plane, on the side of the cover 360. The tooth 416 has an inside longitudinal end which is beveled and which is intended to cooperate with the ramp 380 of the finger 378 of the push-button 370, as can be seen in FIGS. 16 and 17.

It can also be seen that the finger 378 and the tab 382 are substantially in a same horizontal plane (FIGS. 16 and 17). The tab 382 is elastically deformable, in particular in a flexural manner, in said horizontal plane, from a free position substantially without constraint shown in the figures, into a flexed or deformed position toward the end piece 28.

As can be seen in FIGS. 13 to 16, the wall 386 of the cover 360 covers the top edge 322 of the base 358 as well as its tab 382. The tab 382 is thus almost not visible from the outside and is protected. It is thus not possible to access said tab 382 directly, its actuation only being possible by selecting the push-button 370.

As is also understood, the hollow 414 in the base 358 integrates the function of the bore 184 from the preceding variant, as it is crossed by the finger 378 of the push-button 370.

As in the preceding variant, the nozzle spray 350 is positioned and fixed here on the end part 28 of the arm by means of a mounting bracket 390 which allows the spray nozzle 350 to be removed, for the purpose, for example, of replacing it during a maintenance operation.

The mounting bracket 390 has a general elongated form along the axis C. It can be obtained by way of a folded sheet.

The mounting bracket 390 here forms a slider 402 which is intended to cooperate with the rail 400 of the base 358. The longitudinal end parts, respectively bottom 420 and top 422, of the bracket 390 are configured here in order to define the rail 400. More precisely, the mounting bracket 390 includes a longitudinal middle part 424 which extends in a first substantially vertical plane P3 and the aforementioned parts 420, 422 of the bracket are folded in order to extend in a second substantially vertical plane P4 and are moved away from the first plane on the side opposite the end part 28.

The middle part 424 of the mounting bracket 390 has its internal side face 426*a*, which is applied and fixed, for example by bonding or soldering, on the external face of the aforementioned wall 30*b* of the end part 28. The top 422 and bottom 420 parts of the bracket 390 extend at a transverse spacing from the external face of the side wall 30*b* and each define with said wall a longitudinal, substantially straight space 428 in which the vertical part 320*b*, 322*b* of the corresponding edge 320, 322 of the base 358 is intended to be engaged.

The top part 422 of the mounting bracket 390 includes, substantially in its center, a transverse notch 430 which is intended to cooperate with the tooth 416 of the elastic tab 382. Said notch 430, at its outside longitudinal end, includes a face 432 for coupling the tooth 416 of the tab 382.

The inside and outside longitudinal ends of the parts 420, 422 can be beveled in order to facilitate their insertion into the grooves 324 of the base 358, as is shown in FIGS. 12 to 14.

The tooth 416 is configured in order to be coupled with the mounting bracket 390 coming to rest on or at least facing the coupling face 432 of the notch 430. In said position, the tooth 416 holds the spray nozzle 350 which, here, is prevented from moving translationally along the axis C, on the side of the tube 352, that is to say inward.

As can be seen in FIG. 14, the base 358 can include on its face 388 at least one side guide 389*a* in order to facilitate the positioning of the spray nozzle 350 in relation to the bracket 390 along the axis C, and at least one side guide 389*b* in order to facilitate the positioning of the spray nozzle 350 in relation to the bracket 390 along the vertical axis, substantially perpendicular to the axis C. On its face 388, the base 350 can include, furthermore, a guiding ramp 391 which is intended to cooperate with the external face 426*b* of the middle part 424 of the bracket 390 by sliding.

The mounting of the spray nozzle 350 of FIGS. 11 to 17 can be realized in the following manner. The base 358 and the cover 360 are fixed together then the hose 354 is connected to the tube 352 so as to be able to supply the spray nozzle 350 with washer fluid. The spray nozzle 350 is arranged as shown in FIG. 13, so that its longitudinal axis C is substantially parallel to that of the mounting bracket 390 and that the parts of the bracket 390 are aligned with the grooves of the base 358. The spray nozzle is then made to slide along the base along the axis C, inward. The internal face and the wall 386 of the base 358 cooperate with the mounting bracket 390, and in particular with its parts 420, 422, in order to facilitate and guide said sliding movement. The sliding movement is realized until the spray nozzle 350 comes to rest, for example, by way of its transverse edge 410, on the outside longitudinal end of the bracket 390, as can be seen in FIG. 15.

Just before reaching said position, the top longitudinal part of the mounting bracket 390 comes to rest on the tooth of the tab 382 which is deformed elastically in a flexural manner toward the end piece 28. When the aforementioned position is reached, the tooth 416 can engage in the notch 430 of the bracket 390 and the tab resumes a position without constraint shown in the drawings. The spray nozzle 350 is therefore locked on the mounting bracket 390. Washer fluid can pass through the internal passage of the tube 352 and arrive in the primary channel of the cover 360 in order then to supply the different secondary channels 368 of the base 358. The fluid is then projected through the openings 356 onto several impact zones of the windshield as described above.

FIGS. 18 to 24 are now referred to showing another realization variant of the invention. The description above in relation to the blade 12 and to the arm 14 of the windowwiper 10 is applicable to said variant.

The spray nozzle 550 has an elongated form which is substantially parallelepipedal. The axis of elongation C of the spray nozzle 550 is substantially parallel to the axis A, the axes A, B and C being able to be coplanar, as indicated above.

The spray nozzle 550 includes a fluid inlet and projection openings 556. The fluid inlet is formed here by a male-type tube 552 which is engaged in an end of a flexible hose 554 which is borne by the arm 14 and which is connected to a pump and to a reservoir for vehicle washer fluid. The tube 552 extends here substantially parallel to the axis C.

The spray nozzle 550 includes several projection openings 556, here five. Each opening 556 allows the washer fluid to be sprayed in a given direction. The projection directions defined by the openings 556 are all different here, as explained above in relation to the first embodiment.

The spray nozzle 550 includes here two parts which are mounted one on the other, namely a base 558 and a cover 560. The base 558 essentially includes all the characteristics of the base 158 described above and includes other characteristics which will be described below. In the same way, the cover 560 essentially includes all the characteristics of the cover 160 described above and includes other characteristics which will be described below.

Moreover, the removable mounting bracket 590 of the spray nozzle 550 on the arm 14 includes all the characteristics of the bracket 190 with the exception of those relating to the recess 214 and to the tab 182. The mounting bracket 590 also includes new characteristics which will be described below.

The cover 560 has a substantially L-shaped form here in longitudinal section and includes a main body which is similar to the cover 60 described above and which is connected at its inside longitudinal end to a transverse wall 586 substantially perpendicular to the main body. The body of the cover 560 has an orientation which is substantially vertical along the axis C whilst its wall 586 has an orientation which is substantially vertical perpendicularly to said axis C and which extends from the body toward the end part 28 of the arm.

The body of the cover 560 includes an internal side face 562*a* defining a first joint plane P1 (with the external side face 562*b* of the base 558), and the wall 586 includes an outside transverse face defining a second joint plane P2 (FIG. 19). The base 558 and the cover 560 are thus fixed together at the two joint planes P1, P2 which here are substantially perpendicular.

The cover 560 includes, furthermore, two push-buttons, respectively top 570*a* and bottom 570*b*.

Each button 570*a*, 570*b* is formed by a substantially horizontal, planar wall which extends substantially parallel to the axis C. The wall of each button 570*a*, 570*b* has a longitudinal end, here inside, connected to the wall 586 and an opposite longitudinal end, here outside, which is free and bears a supporting finger 578*a*, 578*b*. The fingers 578*a*, 578*b* of the two buttons 570*a*, 570*b* are substantially facing one another when the cover 560 is separated from the base 558. Each wall is deformable in a flexural manner, in particular by moving their fingers 578*a*, 578*b* closer. The flexural movements take place here in a substantially horizontal plane, perpendicular to the axis C. The flexure of the walls can be realized by tightening and moving the buttons 570*a*, 570*b* closer, for example, by means of two fingers of a hand. The buttons 570*a*, 570*b* are formed here of one single part with the cover 560.

In addition to the characteristics of the base 158, the base 558 includes here the following characteristics. The ribs 612 of the base 558, which form the rail 600 and which cooperate with the recesses 604 of the bracket, are connected at their opposite transverse ends to the cover 560 at the longitudinal edges, respectively bottom 620 and top 622, which are substantially coplanar and vertical and which extend here respectively downward and upward. Each edge 620, 622 extends at a (transverse) spacing from the internal side face 688 of the base 558 in order to define a longitudinal groove 624 with said face.

As can be seen in FIG. 21, each edge 620, 622 extends over just part of the longitudinal extension of the corresponding rib 612 as it is connected at one of the its longitudinal ends, here the outside end, to an elastically deformable tab 582*a*, 582*b*, here in a flexural manner. Each tab 582*a*, 582*b* extends along an outside longitudinal end part of the corresponding rib 612, substantially parallel to the axis C.

Each tab 582*a*, 582*b* has an elongated form along the axis C and includes an inside longitudinal end for connection to the rest of the base 558 and a free outside longitudinal end on which a coupling tooth 616 is provided. The tooth 616 juts out from said end and extends in a substantially vertical plane, on the side opposite the other tab. The tooth 616 has an outside longitudinal end which is beveled and which is intended to cooperate with the finger 578*a*, 578*b* of a push-button 570*a*, 570*b*, as can be seen in FIG. 21. In conclusion, the top tab 582*a* bears a coupling tooth 616 which extends upward and which cooperates with the finger 578*a* of the top push-button 570*a*, and the bottom tab 582*b* bears a coupling tooth 616 which extends downward and which cooperates with the finger 578*b* of the bottom push-button 570*b*.

It can be seen in FIG. 21 that the fingers 578*a*, 578*b* and the tabs 582*a*, 582*b* are substantially in a same vertical plane which is substantially parallel to the axis C. Each tab 582*a*, 582*b* is elastically deformable, in particular in a flexural manner, in said vertical plane, from a free position substantially without constraint shown in the figures, into a flexed or deformed position in which it is moved closer to the other tab, and more precisely to the closest rib 612.

As can be seen in the drawings, the tabs 582*a*, 582*b* are almost not visible from the outside as they are covered and protected by the buttons 570*a*, 570*b*. It is thus not possible to access said tabs 582*a*, 582*b* directly, their actuation only being possible by selecting the push-buttons 570*a*, 570*b*.

As in the preceding variant, the spray nozzle 550 here is positioned and fixed on the end part 28 of the arm by means of a mounting bracket 590 which allows the spray nozzle 550 to be removed, for the purpose, for example, of replacing it during a maintenance operation.

The mounting bracket 590 has a general elongated form along the axis C and includes the characteristics of the bracket 190 described above.

The top 608 and bottom 609 edges of the bracket 590 (being part of the slider 602) here have an L-shaped form in section and include a substantially horizontal longitudinal first part for connection of the external side face 688 of the base to a substantially vertical longitudinal second part, said latter extending substantially parallel and at a spacing from the external face 688 of the bracket 590 in order to define a longitudinal groove 689 for the accommodating and sliding of a corresponding edge 620, 622 of the spray nozzle 550, as can be seen in the drawings.

As can be seen in FIGS. 19 and 20, the longitudinal ends, here inside ends, of the vertical parts of edges 608, 609 are beveled here in order to facilitate the mounting of the spray nozzle 550 on the bracket 590.

At its outside longitudinal end, the mounting bracket 590 includes a transverse edge 610 which is separated here in the longitudinal direction from the edges 608, 609 in order to define the hollows 614 for mounting the teeth 616 of the elastic tabs 582a, 582b. Each hollow 614 is delimited at its inside longitudinal end by an end transverse face 632 of an edge 608, 609 of the bracket 590, on which the tooth 616 of the corresponding tab 582a, 582b can come to rest or face.

The teeth 616 are configured to be coupled with the bracket 590 when coming to rest on or at least to face the faces 632 of the hollows 614. In said position, the teeth 616 hold the spray nozzle 550, which is prevented here from moving translationally along the axis C, on the side of the tube 552, that is to say inward.

Figure 24:
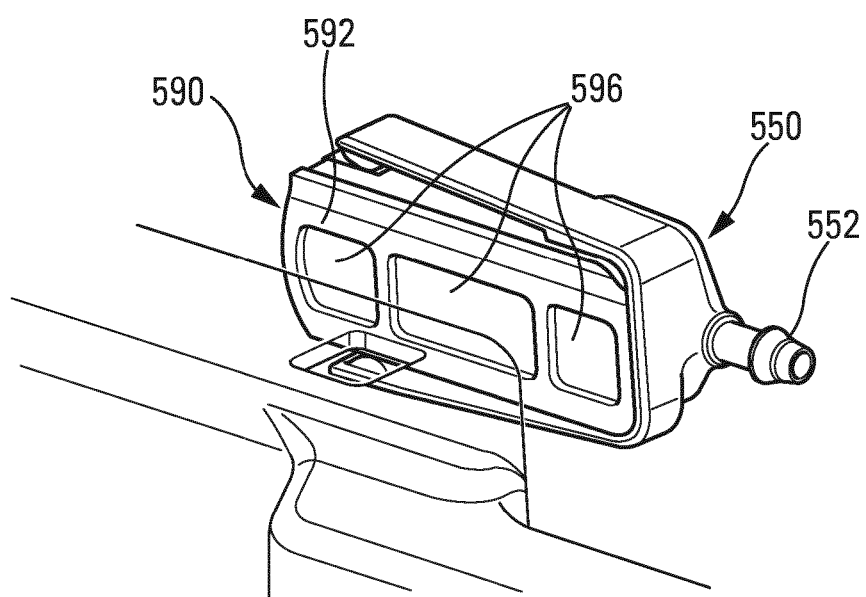

The mounting bracket 590 includes here, on its internal face 592, cavities 596 which are intended to facilitate the mounting of the bracket on the end part 28, for example by bonding or soldering (FIG. 24). The cavities 596 can receive, for example, an amount of adhesive in order to improve the anchoring of said adhesive in relation to the mounting bracket 590.

The mounting of the spray nozzle 550 of FIGS. 18 to 24 can be realized in the following manner. The base 558 and the cover 560 are fixed together then the hose 554 is connected to the tube 552 so as to be able to supply the spray nozzle 550 with washer fluid. The spray nozzle 550 is arranged as shown in FIG. 20, so that its longitudinal axis C is substantially parallel to that of the mounting bracket 590 and that the edges 620, 622 of the base are aligned with the grooves 689 of the bracket (and that the vertical parts of the edges 608, 609 of the bracket are aligned with the grooves 624 of the base). The spray nozzle is then made to slide along the bracket 590 along the axis C, outward. Said sliding movement brings about the elastic deformation of the tabs 582a, 582b which slide in the grooves 589 of the bracket 590. The sliding movement is realized until the spray nozzle 550 comes to rest, for example, by way of the ribs 612 of its rail 600 on the transverse edge 610 of the bracket 590. Just before reaching said position, the teeth 616 engage in the hollows 614 of the bracket 590 and the tabs 582a, 582b resume a position without constraint shown in the drawings. The spray nozzle 550 is therefore locked on the mounting bracket 590. Washer fluid can pass through the internal passage of the tube 552 and arrive in the primary channel of the cover 560 in order then to supply the different secondary channels 568 of the base 558. The fluid is then projected through the openings 556 onto several impact zones of the windshield as described above.

The invention claimed is:

1. A spray nozzle for a window-wiper for a motor vehicle, comprising:
   a base and a cover;
   first fixing means for removable fixing which are configured to co-operate with second fixing means of a mounting bracket of said spray nozzle; and
   at least one actuating means, which is independent of said first and second fixing means, the at least one actuating means being configured to disengage the spray nozzle from the mounting bracket and thus allow the spray nozzle to be disassembled from the mounting bracket, the at least one actuating means being formed of one single part with the cover of the spray nozzle,
   wherein the least one actuating means comprises an actuating finger jutting out from an internal face of the least one actuating means, and
   wherein the base includes a through-bore for accommodation and passage of the actuating finger of the cover.

2. The spray nozzle as claimed in claim 1, wherein said spray nozzle comprises at least two assembled parts.

3. The spray nozzle as claimed in claim 1, wherein said at least one actuating means is pivoted about a pivot axis defined by a hinge.

4. The spray nozzle as claimed in claim 3, wherein said hinge is formed by a thin film.

5. The spray nozzle as claimed in claim 3, wherein said spray nozzle has an elongated form, said pivot axis being substantially parallel or perpendicular to an axis of elongation of the spray nozzle.

6. An assembly comprising:
   the spray nozzle as claimed in claim 1; and
   the mounting bracket of said spray nozzle, said mounting bracket being configured to be positioned and fixed on a head of an arm of the window-wiper.

7. The assembly as claimed in claim 6, wherein said mounting bracket is configured to be bonded or soldered onto a clevis of the head of a window-wiper arm.

8. The assembly as claimed in claim 6, wherein said first fixing means and the second fixing means include a first system with rail and slider and/or a second system with elastic snap-in means, said system being configured so as to allow the mounting of the spray nozzle on the mounting bracket by sliding one in relation to the other.

9. The assembly as claimed in claim 8, wherein the elastic snap-in system includes at least one elastically deformable tab which is borne by one of the spray nozzle and the mounting bracket, said tab comprising at a free end a retaining means which is configured to cooperate with a complementary means of the other of the spray nozzle and the mounting bracket.

10. The assembly as claimed in claim 9, wherein the mounting bracket bears said tab which includes at the free end a coupling tooth which is configured to be engaged in an opening of the spray nozzle, wherein the at least one actuating means is configured to force said coupling tooth to exit from the opening.

11. The assembly as claimed in claim 10, wherein said elastically deformable tab is configured to be deformed solely by said least one actuating means.

12. The assembly as claimed in claim 11, wherein the elastically deformable tab is borne by said mounting bracket and includes at a free end a coupling tooth which is intended to be engaged in the opening or a hollow of the spray nozzle.

13. The assembly as claimed in claim 8, wherein the elastic snap-in system is configured to be actuated as the spray nozzle slides along the mounting bracket.

14. The assembly as claimed in claim 8, wherein the system with rail and slider includes at least one rib which is substantially straight and juts out from one of the spray nozzle and the mounting bracket, and is engaged in a recess of the other of the spray nozzle and the mounting bracket, said recess being substantially straight and having a form which is substantially complementary to that of the rib.

15. The assembly as claimed in claim 14, wherein each rib has a beveled end in order to facilitate insertion of each rib into the corresponding recess.

16. The assembly as claimed in claim 8, wherein the system with rail and slider includes two substantially straight ribs which are formed jutting out from one of the spray nozzle and the mounting bracket, and are engaged respectively in two recesses of the other of the spray nozzle and the mounting bracket, said recesses being substantially straight and having a form which is substantially complementary to that of the rib.

17. The assembly as claimed in claim 16, wherein the ribs diverge from one another in cross section to form retaining means in said recesses.

18. An arm of a window-wiper of a motor vehicle, comprising:
a head for connection to a blade of a window-wiper, wherein said arm bears an assembly as claimed in claim 6, the mounting bracket of which is positioned and fixed by one of bonding or soldering, on said head.

19. The arm as claimed in claim 18, wherein the head includes a clevis which is configured to receive a connector of said blade of the window-wiper.

* * * * *